United States Patent [19]
Dayan et al.

[11] Patent Number: 5,555,373
[45] Date of Patent: Sep. 10, 1996

[54] INACTIVITY MONITOR FOR TRUSTED PERSONAL COMPUTER SYSTEM

[75] Inventors: Richard A. Dayan; Palmer E. Newman, both of Boca Raton, Fla.

[73] Assignee: International Business Machines Corporation, Armonk, N.Y.

[21] Appl. No.: 383,884

[22] Filed: Feb. 6, 1995

[51] Int. Cl.⁶ .................................................. G06F 11/00
[52] U.S. Cl. ...................................................... 395/188.01
[58] Field of Search ............................... 395/188.01, 186, 395/187.01, 182.12, 182.2, 182.21, 182.22

[56] References Cited

U.S. PATENT DOCUMENTS

| | | | |
|---|---|---|---|
| 4,950,860 | 9/1990 | Watters et al. | 380/4 |
| 5,014,982 | 5/1991 | Okada et al. | 364/410 |
| 5,388,156 | 2/1995 | Blackledge, Jr. et al. | 380/4 |

*Primary Examiner*—Hoa T. Nguyen
*Attorney, Agent, or Firm*—Malin, Haley, DiMaggio & Crosby, PA

[57] ABSTRACT

A personal computer system is described, having security features enabling control over access to data retained in such a system. The system has a normally closed enclosure, at least one erasable memory element for selective activation to active and inactive states and for receiving and storing a privileged access password when in the active state, an option switch operatively connected with the erasable memory element for setting the erasable memory element to the active and inactive states, a tamper detection switch operatively connected with the erasable memory element for detecting opening of the enclosure, and a system processor operatively connected with the erasable memory element for controlling access to at least certain levels of data stored within the system by distinguishing between entry and non-entry of any stored privileged access password and between detection and non-detection of opening of the enclosure by the tamper detection switch. In addition, an inactivity monitor is provided for measuring the time period between successive uses of the system and for determining whether or not the measured time period exceeds a specified inactivity period. A utility is provided for rendering the monitor enabled. When the enabled monitor determines that the measured time exceeds the specified time, power-up of the system is prevented until the privileged access password (or a power-on password) is successfully entered into the system by a user.

19 Claims, 17 Drawing Sheets

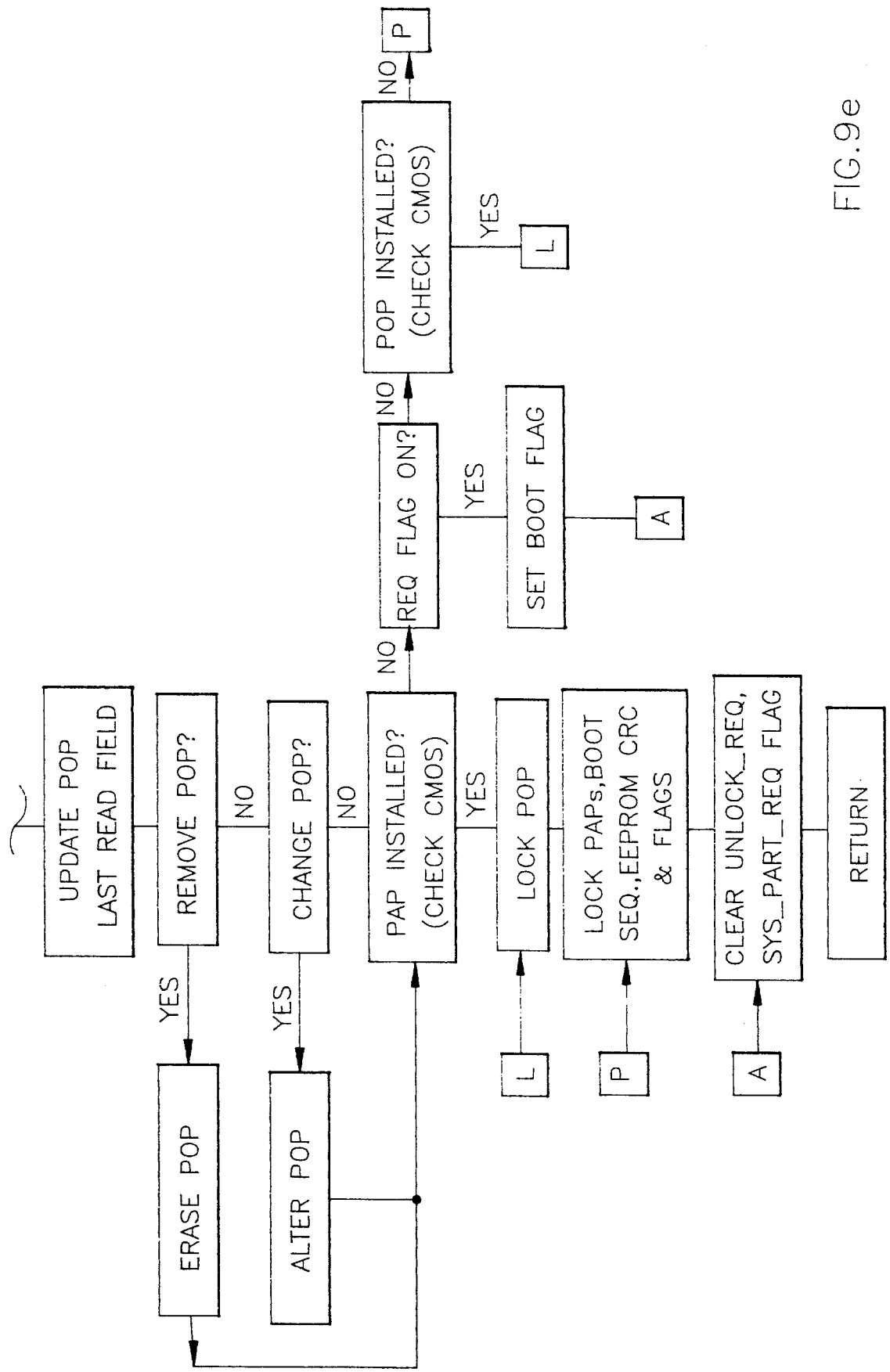

INACTIVITY MONITOR FOR TRUSTED PERSONAL COMPUTER SYSTEM

RELATED APPLICATIONS

The invention described herein is related to that described in U.S. application Ser. No. 07/840,965 filed Feb. 26, 1992, now U.S. Pat. No. 5,388,156 entitled "Personal Computer System With Security Features and Method" and to that described in U.S. application Ser. No. 07/889,325 filed May 22, 1992, entitled "Trusted Personal Computer System With Limited Accessibility," both of which are held in common ownership with this invention.

BACKGROUND OF THE INVENTION

1. Field of the Invention

This invention relates to personal computer systems and, more particularly, to such a system having security features enabling control over access to data retained in such a system.

2. Description of the Prior Art

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard (also known as and occasionally mentioned herein as a system board, system planar or planar) to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, 35, 40, L40SX, 50, 55, 57, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. Early Family I models typically used the popular INTEL 8088 or 8086 microprocessor as the system processor. Certain later Family I and the Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provides hardware compatibility with software written for the 8086 and 8088 microprocessors.

With the phenomenal growth and use of personal computers in the world in recent years, more and more data or information is being collected and retained or stored in such systems. A lot of this data is sensitive in nature. In the wrong hands, data could become embarrassing to individuals, a company could lose a competitive edge, or sensitive data could be used to force payment for silence or lead to physical violence against individuals. As more users recognize the sensitive nature of data and its value, the more it becomes desirable to protect against such misuse. To protect themselves and the persons associated with the stored data, users are requiring incorporation of security and integrity features into the personal computers that they purchase.

Users are not the only people to recognize the sensitivity of the data being collected and stored. Governments are also enacting laws to enforce protection of sensitive data. One such government is that of the United States. It has recognized and responded to the gravity of the situation. The United States federal government has defined security levels and the associated requirements it takes to meet those levels, and provides a certification agency for personal computer manufacturers to submit products in order to see if the products meet the security level claimed by the manufacturer. The source for the Federal Requirements is the Department of Defense, Trusted Computer System Evaluation Criteria, DOD 5200.28 STD, 12/85, generally referred to as The Orange Book. The government has legislated that by Jan. 1, 1992 all data related to the government must only be processed and stored on personal computers with a minimum security level of C-2. For computer system hardware, the essence of the requirements is contained in the Assurance section, Requirement 6: "trusted mechanisms must be continuously protected against tampering and/or unauthorized changes . . . "

Beginning with the earliest personal computer system of the Family I models, such as the IBM Personal Computer, it was recognized that software compatibility would be of utmost importance. In order to achieve this goal, an insulation layer of system resident code, also known as "firmware", was established between the hardware and software. This firmware provided an operational interface between a user's application program/operating system and the device to relieve the user of the concern about the characteristics of hardware devices. Eventually, the code developed into a Basic Input/Output System (BIOS), for allowing new devices to be added to the system, while insulating the application program from the peculiarities of the hardware. The importance of BIOS was immediately evident because it freed a device driver from depending on specific device hardware characteristics while providing the device driver with an intermediate interface to the device. Since BIOS was an integral part of the system and controlled the movement of data in and out of the system processor, it was resident on the system planar and was shipped to the user in a read only memory (ROM). For example, BIOS in the original IBM Personal Computer occupied 8K of ROM resident on the planar board.

As new models of the personal computer family were introduced, BIOS had to be updated and expanded to include new hardware and I/O devices. As could be expected, BIOS started to increase in memory size. For example, with the introduction of the IBM PERSONAL COMPUTER AT, BIOS grew to require 32K bytes of ROM.

Today, with the development of new technology, personal computer systems of the Family II models are growing even more sophisticated and are being made available to consumers more frequently. Since the technology is rapidly changing and new I/O devices are being added to the personal computer systems, modification to the BIOS has become a significant problem in the development cycle of the personal computer system.

For instance, with the introduction of the IBM Personal System/2 with Micro Channel architecture, a significantly new BIOS, known as advanced BIOS, or ABIOS, was developed. However, to maintain software compatibility, BIOS from the Family I models had to be included in the Family II models. The Family I BIOS became known as Compatibility BIOS or CBIOS. However, as previously explained with respect to the IBM PERSONAL COMPUTER AT, only 32K bytes of ROM were resident on the planar board. Fortunately, the system could be expanded to 96K bytes of ROM. Unfortunately, because of system constraints, this turned out to be the maximum capacity available for BIOS. Luckily, even with the addition of ABIOS, ABIOS and CBIOS could still squeeze into 96K of ROM. However, only a small percentage of the 96K ROM area remained available for expansion. It has been believed that, with the addition of future I/O devices, CBIOS and ABIOS will eventually run out of ROM space. Thus, new I/O technology will not be able to be easily integrated within CBIOS and ABIOS.

Due to these problems, plus the desire to make modifications in Family II BIOS as late as possible in the development cycle, it became necessary to offload portions of BIOS from the ROM. This was accomplished by storing portions of BIOS on a mass storage device such as a fixed disk, preferably in a defined portion of such a disk known as a system partition. The system partition also stores an image of a system reference diskette, which includes certain utility programs used in establishing system configuration and the like. Since a disk provides writing as well as reading capabilities, it became feasible to modify the actual BIOS code on the disk. The disk, while providing a fast and efficient way to store BIOS code, nevertheless greatly increased the probability of the BIOS code being corrupted. Since BIOS is an integral part of the operating system, a corrupt BIOS could lead to devastating results and in many cases to complete failure and non-operation of the system. Thus, it became quite apparent that a means for preventing unauthorized modification of the BIOS code on the fixed disk was highly desirable. This was the subject matter of U.S. patent application Ser. No. 07/398,820, filed Aug. 25, 1989, and now U.S. Pat. No. 5,022,077 issued 4 Jun. 1991. The interested reader is referred to that patent for additional information possibly helpful in understanding of the invention here disclosed, and the disclosure of that patent is hereby incorporated by reference into this specification to any extent necessary to a full understanding of the inventions here disclosed.

With the introduction of IBM's PS/2 Micro Channel Systems came the removal of switches and jumpers from I/O adapter cards and planar. The Micro Channel Architecture provided for programmable registers to replace them. Utilities to configure these programmable registers or programmable option select (POS) registers were required. These, and other utilities to improve system usability characteristics along with system diagnostics, were shipped with each system on a system reference diskette.

Prior to initial use, each Micro Channel System requires that its POS registers be initialized. For example, if the system is booted with a new I/O card, or a slot change for an I/O card, a configuration error is generated and the system boot up procedure halts. The user is then prompted to load the system reference diskette and press the F1 key. A "Set Configuration Utility" can then be booted from the system reference diskette to configure the system. The Set Configuration Utility will prompt the user for the desired action. If the appropriate I/O card's descriptor files are loaded on the system reference diskette, the Set Configuration Utility will generate the correct POS or configuration data in non-volatile storage. The descriptor file contains configuration information to interface the card to the system.

The related application Ser. No. 840,965 describes a personal computer providing means for limiting access to certain critical data to only those users having a proper privilege to access such data. In realizing this purpose, a specialized memory element is provided for receiving and storing a Power On Password and a Privileged Access Password (sometimes hereinafter called a "POP" and a "PAP" respectively) and for coordinating the access granted to various functions and data to the activation and usage of the passwords. A user may have choices to activate or inactivate the security provisions made available, so that the system can be adapted to varying needs or desires for securing the usage of the system. The system may be adapted to the security requirements of governmental standards if desired and yet also used in an essentially unsecured manner should the circumstances of use so permit. Thus users of such systems are given great flexibility in application of the systems. The teachings of this related Application are described in detail hereinafter in view of its relationship with the invention of the present Application.

Maintaining an audit trail of usage events actions on a secured computer system is of utmost importance in controlling security in a personal computer environment. When a personal computer secure mode is enabled, the security and integrity features provide the system owner with the capability of establishing an audit trail for the secured system. What is lacking in these systems is the capability to prevent usage after a specified period of inactivity. The invention of the present application provides the system owner the capability of specifying a period which, when exceeded, renders a system inoperable until audited by the system owner.

It is therefore an object of the present invention to provide a method and means, preferably operating in combination wit prior art security features, for rendering a personal computer system inoperable after a specified period of non-use and for re-activating the system only after the successful entry of a password.

SUMMARY OF THE INVENTION

With the foregoing in mind, the present invention contemplates a new personal computer feature which, when combined with other security features disclosed in the prior art, places importance on rendering data stored in a personal computer system useless, i.e. inaccessible by an unauthorized user.

The new security feature of the present invention renders a personal computer system inoperable by an unauthorized user in the event that the time period since the last power-up of the system exceeds a predetermined period of time selected by the system owner. The system may be reactivated only by the successful entry of a privileged access password (PAP) in one embodiment or by the successful entry of either a power-on password (POP) or the PAP in a preferred embodiment.

The new security feature renders the personal computer system, after a predetermined period of inactivity, thereafter inoperable to any unauthorized user, i.e. one who does not have knowledge of the system passwords. Thus, at least certain prescribed data contained within the system components cannot be accessed by an unauthorized user.

In a preferred embodiment of the present invention, a personal computer system of the type described above and hereinafter in greater detail includes the optional capability to determine a period of system inactivity exceeding a predetermined value. Thereafter, the system can only be activated after a power-off and power-on by a system owner, authorized user, or normal user properly entering the POP and/or the PAP in response to a PROMPT for a password during a power-up routine.

BRIEF DESCRIPTION OF THE DRAWINGS

Some of the objects of the invention having been stated, other objects will appear as the description proceeds, when taken in connection with the accompanying drawings, in which:

FIGS. 8a–8e and 9a–9e, inclusive are schematic flowcharts illustrating certain functions involved in the security options available in accordance with the tamper evident security feature of the prior art which have been modified to include functions involved in the security feature of the present invention.

DETAILED DESCRIPTION OF INVENTION

Figure 1:
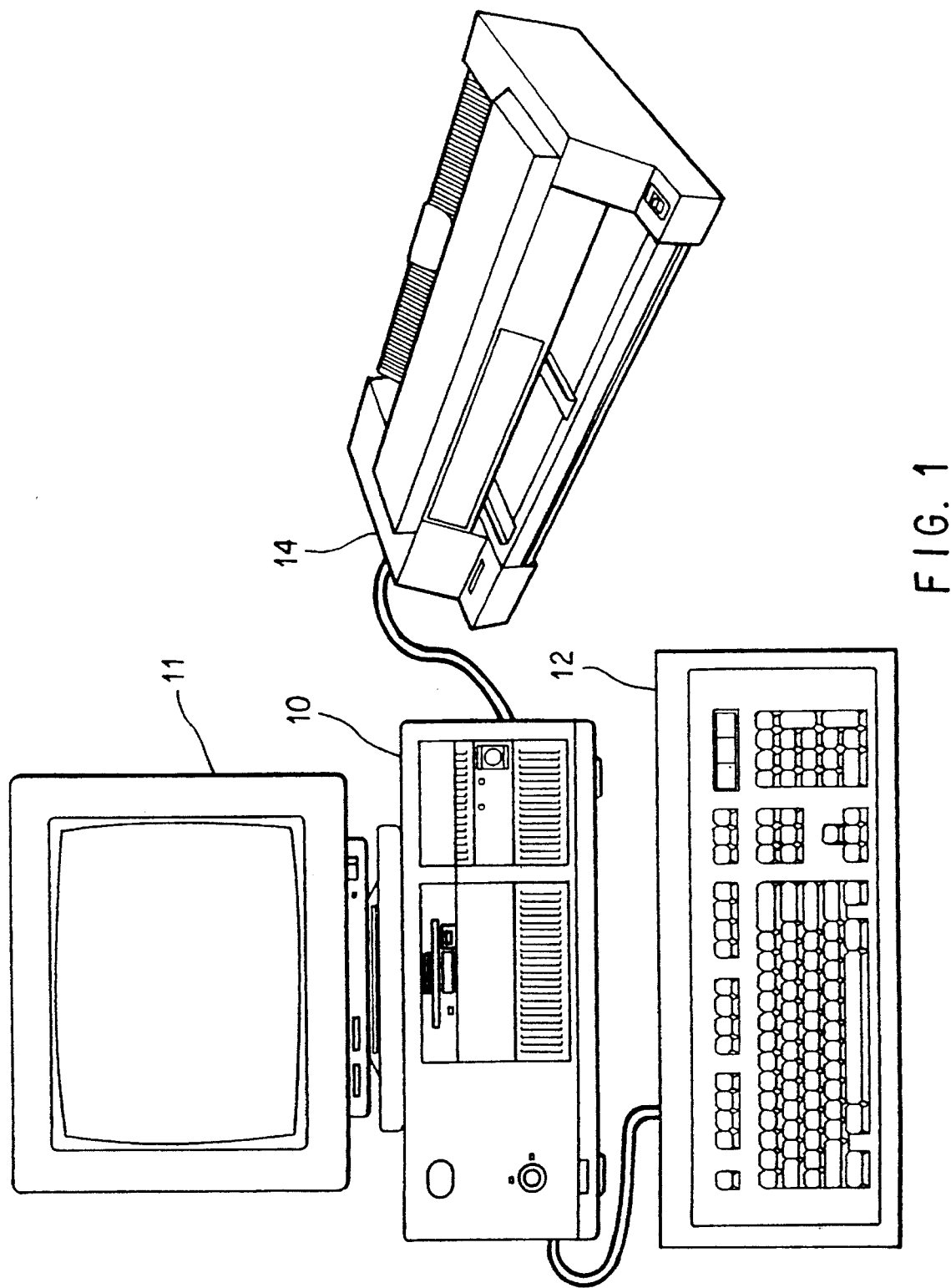
FIG. 1 is a perspective view of a personal computer embodying this invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Certain defined terms may be used herein, as follows:

TRUSTED COMPUTING BASE (TCB): The totality of protection mechanisms within a computer system—including hardware, firmware and software—the combination of which is responsible for enforcing a security policy. A TCB consists of one or more components that together enforce a unified security policy over a product or system. The ability of a TCB to correctly enforce a security policy depends solely on the mechanisms within the TCB and on the correct input by system administrative personnel of parameters (e.g. a user's clearance) related to the security policy.

TRUSTED SOFTWARE: The software portion of a Trusted Computing Base.

TRUSTED PROGRAM: A program included in Trusted Software.

OPEN PROGRAM: A program operable on a Trusted Computing Base and which is other than a Trusted Program.

REFERENCE MONITOR CONCEPT: An access control concept that refers to an abstract machine that mediates all accesses to objects by subjects.

SECURITY KERNEL: The hardware, firmware and software elements of a Trusted Computing Base that implement the reference monitor concept. It must mediate all accesses, be protected from modification and be verifiable as correct.

TRUSTED COMPUTER SYSTEM: A system that employs sufficient hardware and software integrity measures to allow its use for processing simultaneously a range of sensitive or classified information.

SYSTEM OWNER: The system owner is the user who is responsible for configuring and placing a system in secure mode initially. The system owner will control configuration both initially and whenever an update needs to be made. This person will control the Privileged Access Password and be responsible for maintaining its integrity. The system owner will also maintain physical security of the tamper evident cover keylock key. The system owner will be responsible for maintaining security logs on all systems. The system owner will also have to record all attempted security breaches. The system owner may own more than one system. The system owner is considered an authorized user and can also be a normal user.

SECURE MODE: When a system owner has successfully installed the Privileged Access Password on a personal computer system to invoke security protection provided by the security and integrity elements.

AUTHORIZED USER: Any user who is given permission to use the Privileged Access Password. This person may or may not be the system owner. This person may also have a key for a particular system or a set of systems. If this person is involved in recovering a system from a security breach, they are responsible for reporting it to the system owner. An authorized user may also be a normal user.

NORMAL USER: Any user of a system authorized to use the system facilities. In order to change a system configuration or fix a problem, this user requires the assistance of either the system owner or an authorized user. The normal user does not have the Privileged Access Password or the tamper evident cover keylock key unless they belong to either the authorized user or system owner category.

UNAUTHORIZED USER: Any one not defined as a system owner, authorized user or normal user. Any use of a secured personal computer system by an unauthorized user is considered a security breach, other than an unsuccessful power on, and an audit trail must exist showing such breaches.

EEPROM: Electrically Erasable Programmable Read Only Memory. This memory technology provides for nonvolatile storage of data that can be changed under control of hardware logic. Contents of storage is not lost when power is absent. Contents may be altered only when the appropriate controls signals on the module are activated in the predefined sequence.

PASSWORD DESCRIPTION: The system has the potential to be protected by two passwords: 1. Privileged Access Password (PAP) and 2. Power On Password (POP). These passwords are intended to be used independently of one another. The PAP is designed to provide protection for the system owner by protecting the Initial Program Load (IPL)

device boot list, access to the password utility, and access to the System Reference Diskette or System Partition. The System Partition will only be booted in response to a POST error (or on a warm boot) if there is no PAP installed or the PAP was entered initially during the power on sequence. Initial BIOS Load (IBL) from a diskette will be secured in the same manner as booting the System Reference Diskette. The existence of the PAP will be transparent to a normal user using the POP. The PAP will be installed, changed, or deleted by a utility on the System Reference Diskette or in the System Partition. The PAP, when set and entered correctly, will give the owner access to the entire system, overriding the POP. The POP, working as on all current PS/2 systems, is used to prevent any unauthorized access to the Operating System on the DASD or the facilities of the system.

With respect to the inactivity monitor, a system can be in one of two states. The states are defined as follows:

INACTIVE STATE: In this state, the time between successive uses of all installed passwords exceeds the time period specified by the system owner when enabling the inactivity monitor.

ACTIVE STATE: In this state, the time between successive uses of any installed password doesn't exceed the time period specified by the system owner when enabling the inactivity monitor.

Figure 2:
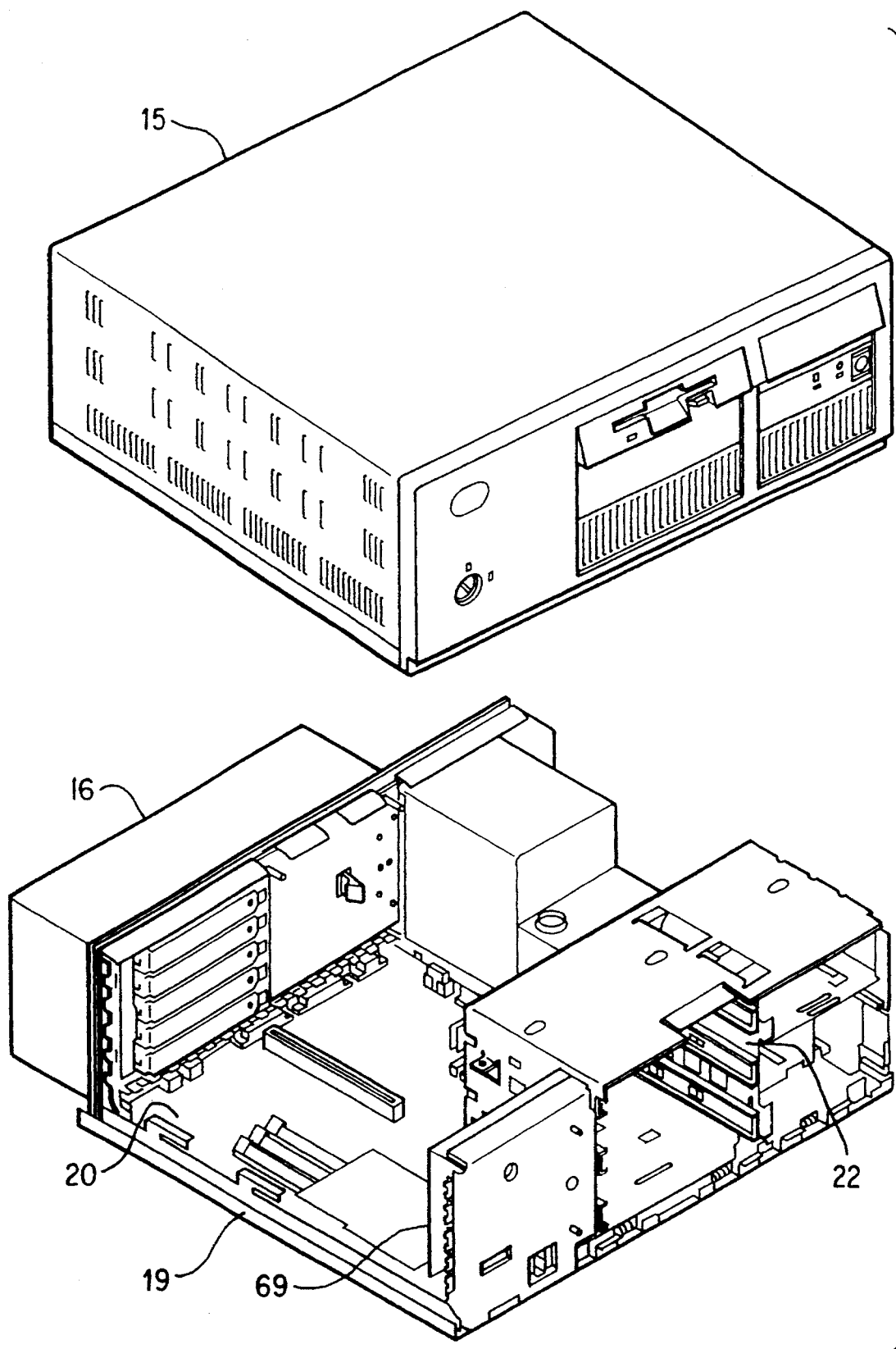
FIG. 2 is an exploded perspective view of certain elements of the personal computer of FIG. 1 including a chassis, a cover, and a planar board and illustrating certain relationship among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 which cooperates with a chassis 19 in defining an enclosed, shielded volume for receiving electrically powered data processing and storage components for processing and storing digital data, as shown in FIG. 2. In the form illustrated in FIG. 2, the computer 10 also has an optional I/O cable connection cover 16 which extends over and protects the connection points of I/O cables with the computer system. At least certain of the system components are mounted on a multilayer planar 20 (also described herein as a motherboard or system board) which is mounted on the chassis 19 and provides a means for electrically interconnecting the components of the computer 10 including those identified above and such other associated elements as floppy disk drives, various forms of direct access storage devices, accessory cards or boards, and the like.

The chassis 19 has a base and a rear panel (FIG. 2, and which may be covered externally by the cable connection cover 16) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22.

Figure 3:
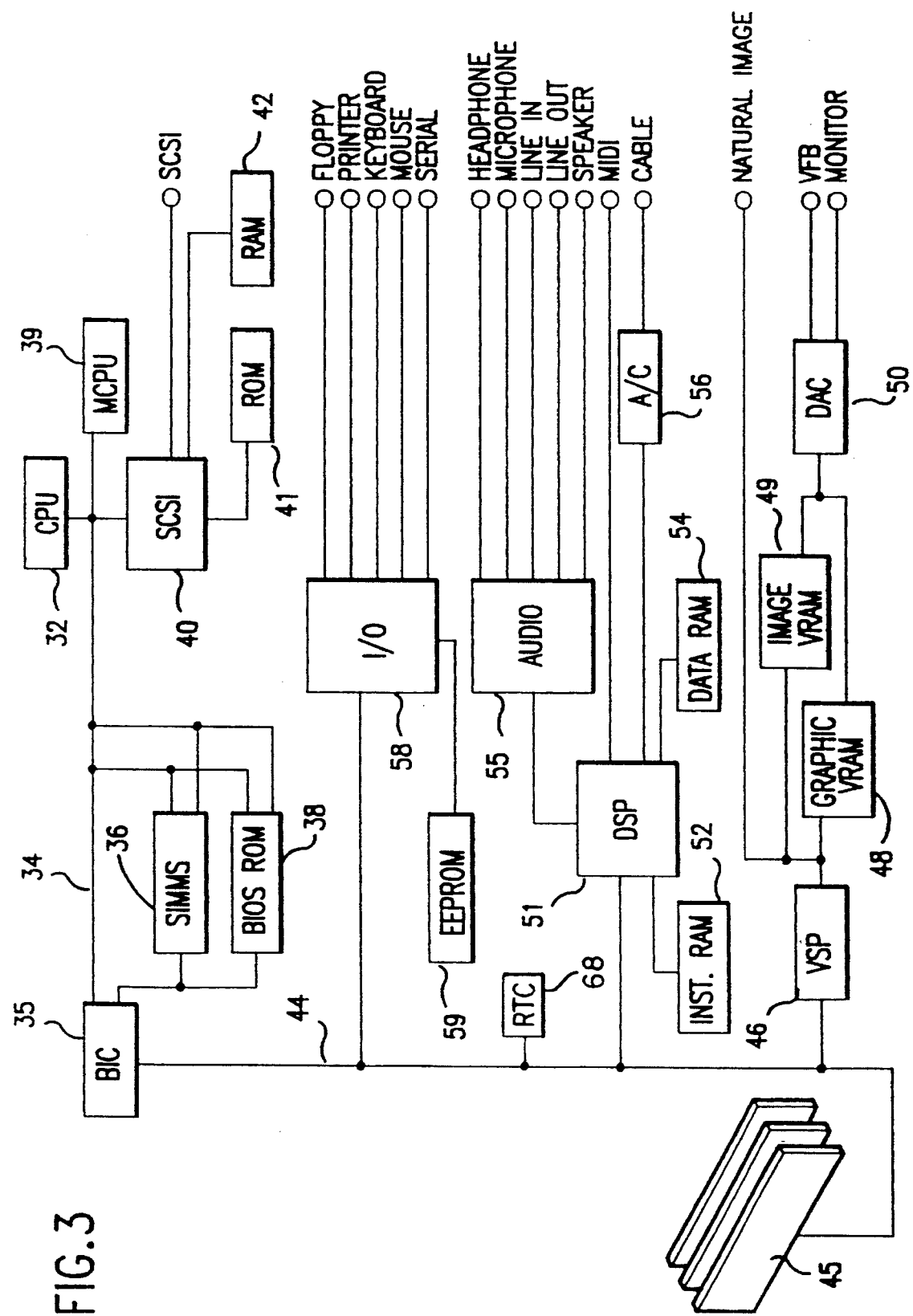
FIG. 3 is a schematic view of certain components of the personal computer of FIGS. 1 and 2.
Figure 4:
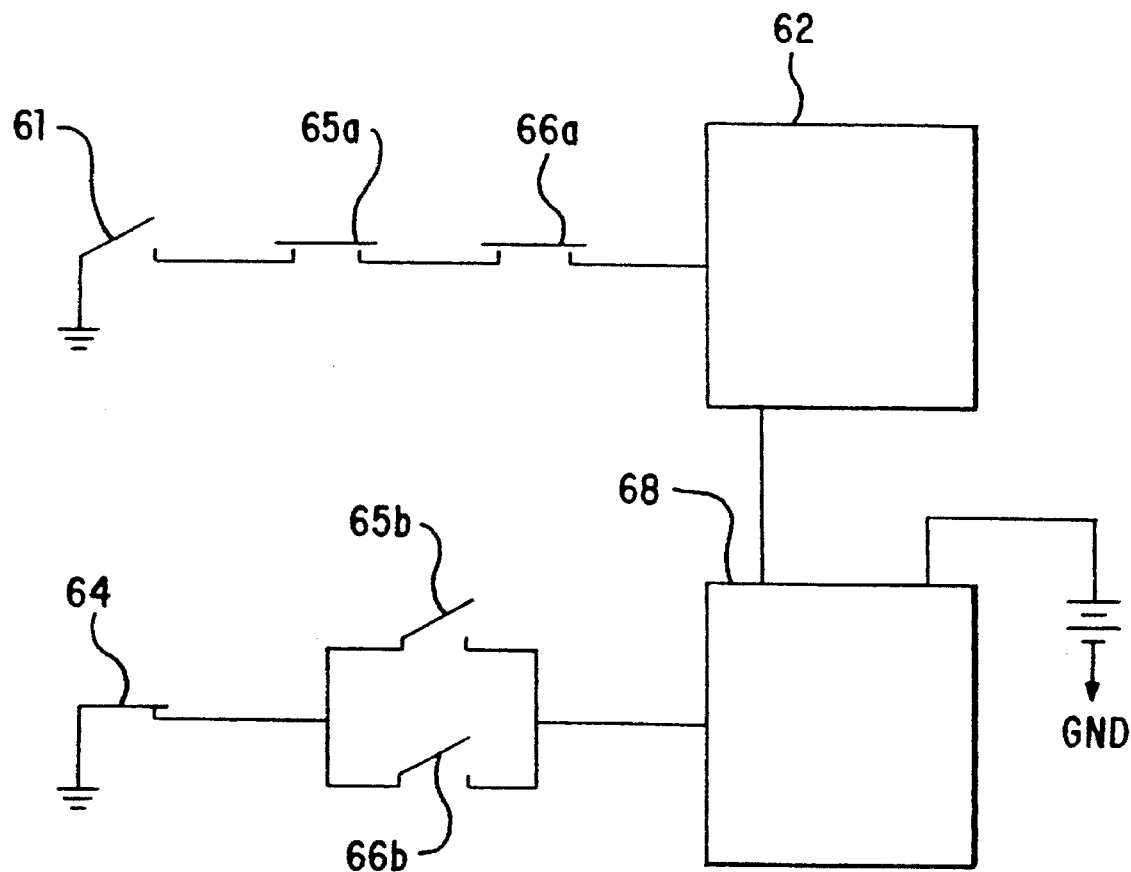
FIGS. 4 and 5 are schematic representations of certain components of the personal computer of FIGS. 1 and 2 which are related to the security features of the prior art and to the security feature of the present invention.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 80386 which is sold by INTEL. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. Instructions stored in the BIOS ROM 38 can be copied into RAM 36 to decrease the execution time of BIOS. The system also has, as has become conventional, a circuit component which has battery backed non-volatile memory (conventionally CMOS RAM) for receiving and retaining data regarding the system configuration and a real time clock (RTC) 68 (FIGS. 3 and 4).

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) also provides for the connection of the microprocessor 32 with a math coprocessor 39 and a Small Computer Systems Interface (SCSI) controller 40. The SCSI controller 40 may, as is known to persons skilled in the arts of computer design and operation, be connected or connectable with Read Only Memory (ROM) 41, RAM 42, and suitable internal or external devices of a variety of types as facilitated by the I/O connection indicated to the right in the Figure. The SCSI controller 4Q functions as a storage controller in controlling storage memory devices such as fixed or removable media electromagnetic storage devices (also known as hard and floppy disk drives), electro-optical, tape and other storage devices.

The bus interface controller (BIC) 35 couples the CPU local bus 34 with an I/O bus 44. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components.

Coupled along the I/O bus 44 are a variety of I/O components such as a video signal processor 46 which is associated with video RAM (VRAM) for storing graphic information (indicated at 48) and for storing image information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with an input/output controller 58 with an associated Electrical Erasable Programmable Read Only Memory EEPROM) 59 by which inputs and outputs are exchanged with conventional peripherals including floppy disk drives, a printer or plotter 14, keyboard 12, a mouse or pointing device (not shown), and by means of a serial port. The EEPROM plays a part in the security provisions described hereinafter.

In achieving certain objectives of securing a personal computer system as described herein, the personal computer system 10 has an erasable memory element mounted within the system enclosure for selective activation to active and inactive states and for receiving and storing a privileged access password (defined more fully hereinafter) when in the active state. The erasable memory element preferably is the electrically erasable programmable read only memory device or EEPROM 59 (FIG. 3) described above. The system also has an option or security switch mounted within the enclosure and operatively connected with the erasable memory element 59 for setting that memory element to the active and inactive states. The option switch (also called security switch in this disclosure) may be, for example, a jumper mounted on the system planar 20 and manually settable to two different states by a person having access to the planar. In one state (also known as the write enable state), the EEPROM 59 is set to be active and to store a PAP as described herein. In the write enable state, the PAP may be written to the EEPROM, changed or removed. In the other or inactive state, the PAP storage capability of the EEPROM is set to be inactive.

Figure 5:
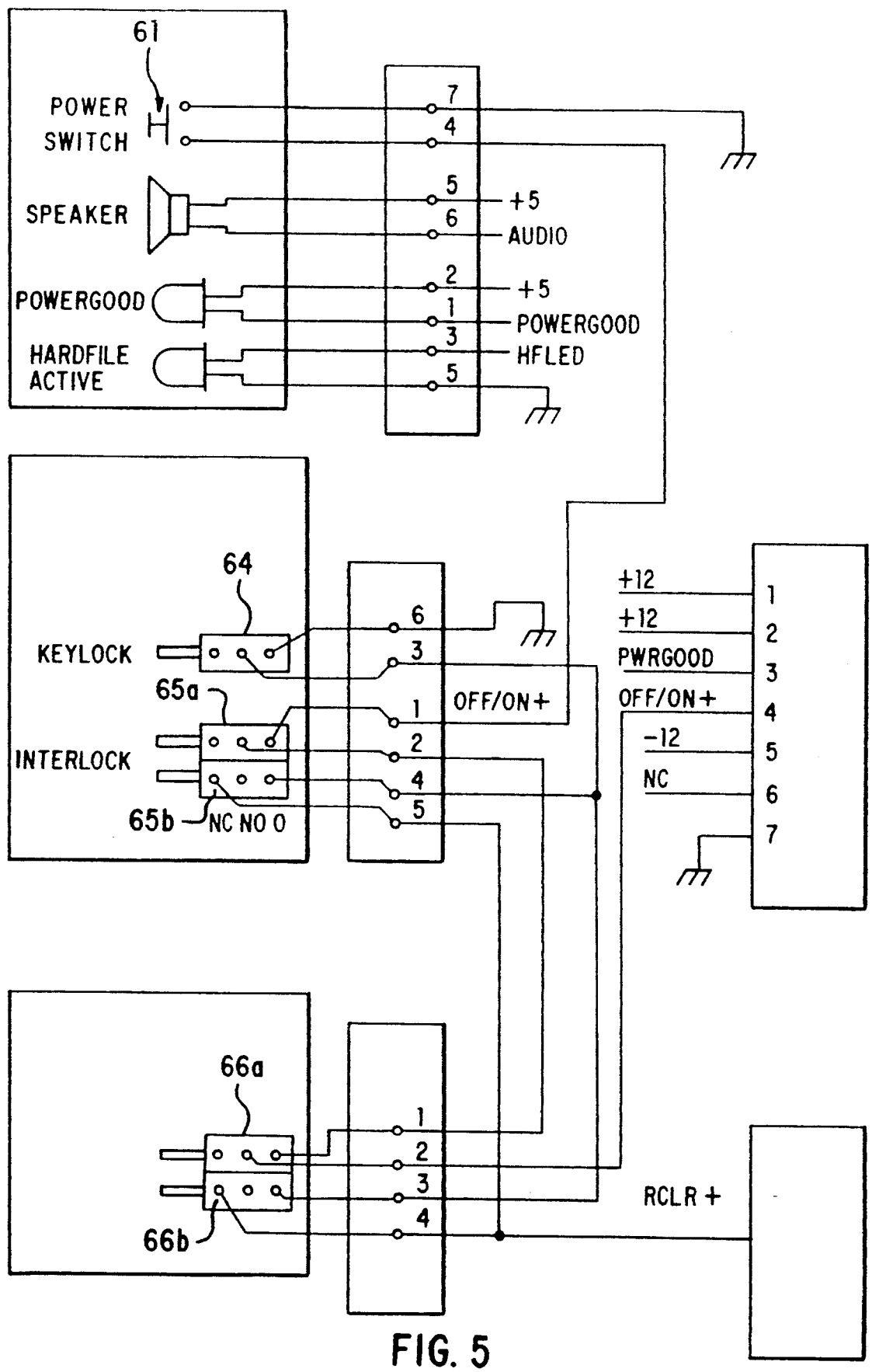
Figure 6:
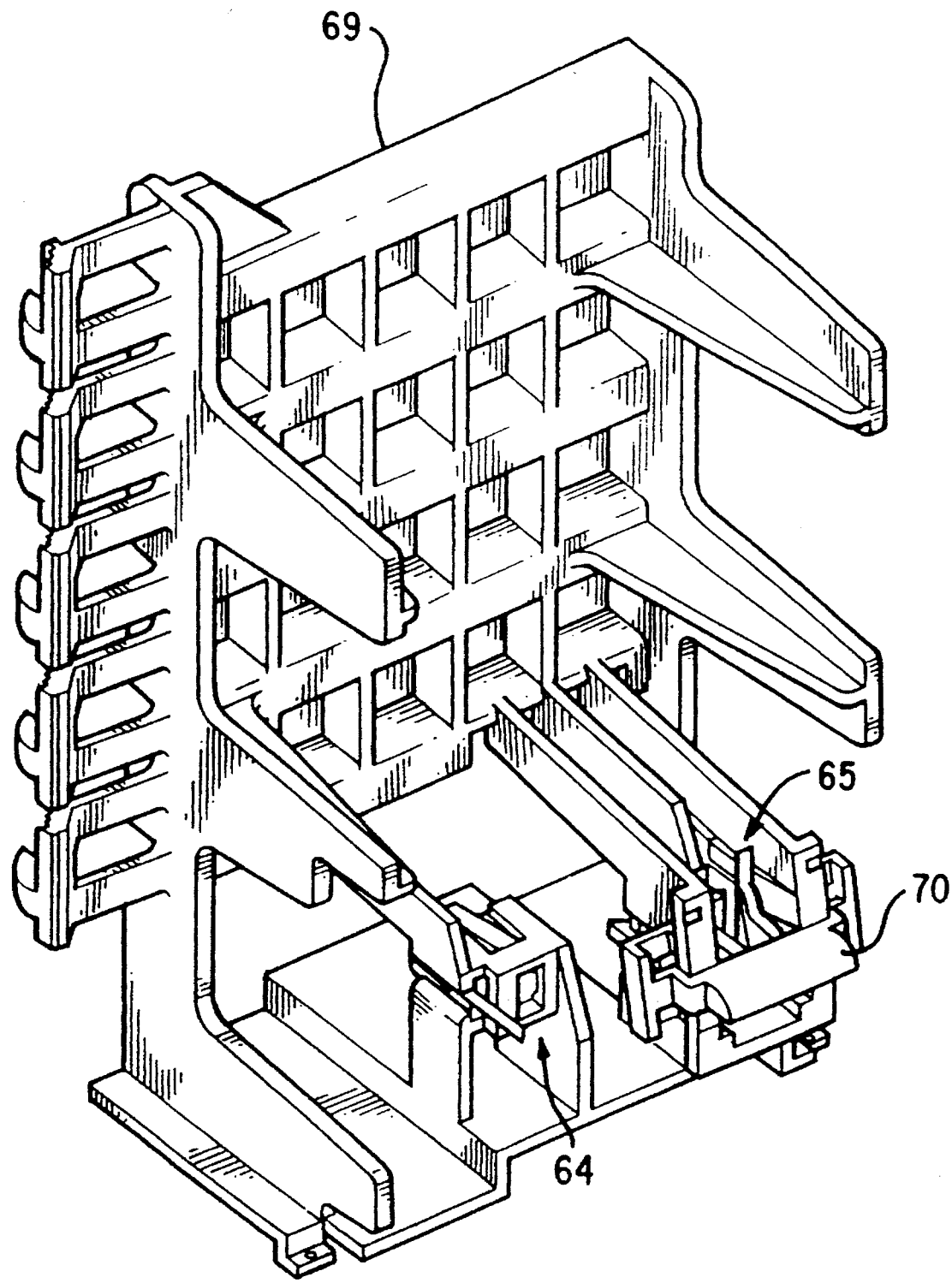
FIG. 6 is an enlarged scale perspective view of certain components illustrated in FIGS. 4 and 5.

As mentioned above, the system 10 also has a second component having erasable memory capabilities, namely battery supported, non-volatile CMOS RAM and an associated real time clock (RTC), indicated at 68 in FIG. 4. The CMOS RAM stores data indicative of the system configuration including data regarding the successful entry of the PAP on power up of the system 10. At lease one tamper detection switch (FIGS. 4, 5 and 6) is provided, mounted within the enclosure and operatively connected with the CMOS RAM for detecting opening of the enclosure and for clearing certain data stored in that memory element in response to any switching of the tamper detection switch.

The system processor 32, in accordance with this invention, is operatively connected with the EEPROM 59 and the CMOS RAM 68 and functions in part for controlling access to at least certain levels of data stored within the system by distinguishing between the active and inactive states of the PAP storage capability of the memory element and between entry and non-entry of any valid, stored privileged access password (PAP). By manipulating the option switch, an operator (or more specifically the person charged with supervising and maintaining the security) of the system may select between secured operation of the system and unsecured operation of the system by selecting respective active and inactive states of the EEPROM. If secured operation is desired and to be effectuated, then the system owner must also enter a PAP.

As here disclosed, the system adapted for security concerns in accordance with this invention has two separate non-volatile erasable memory elements—the EEPROM and the CMOS RAM. This is done, in part, because at the time of this invention, EEPROM have a limited life in terms of the number of cycles of erasing and writing, while the indicators of the state of the PAP and the correct entry of the PAP, as well as at least potentially the state of any unauthorized opening of the system enclosure, may need to be erased and written a large number of times. Thus the functions described herein have been separated into first and second erasable memory elements in order to adapt to presently available technology. However, it is contemplated that the two forms of related data may be stored in a single erasable memory element where either technology so permits or a system designer is willing to accept the limitations which follow.

Figure 7:
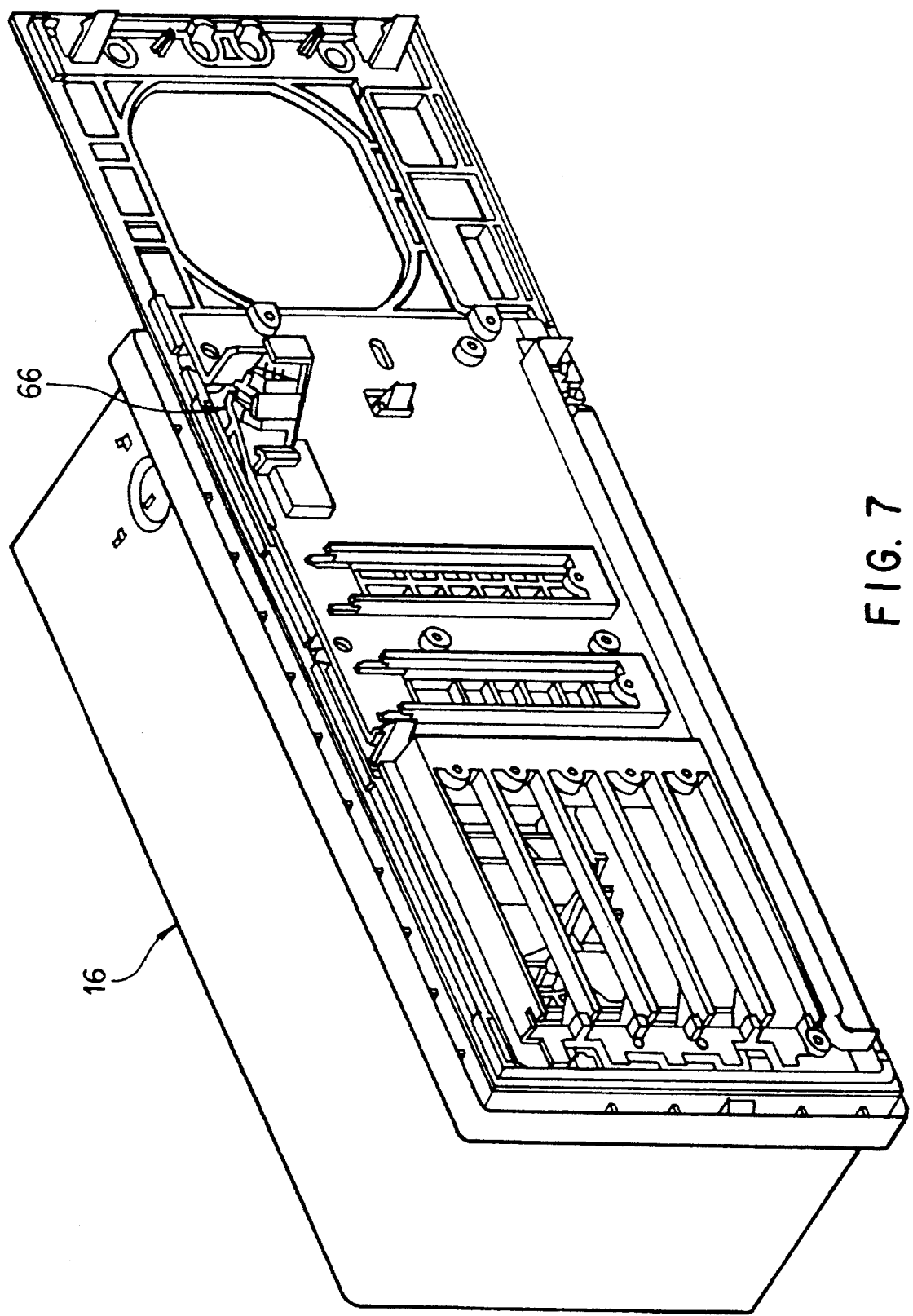
FIG. 7 is a view similar to FIG. 6 of certain optional components of the personal computer of FIGS. 1, 2, 4 and 5.
Figure 8A:
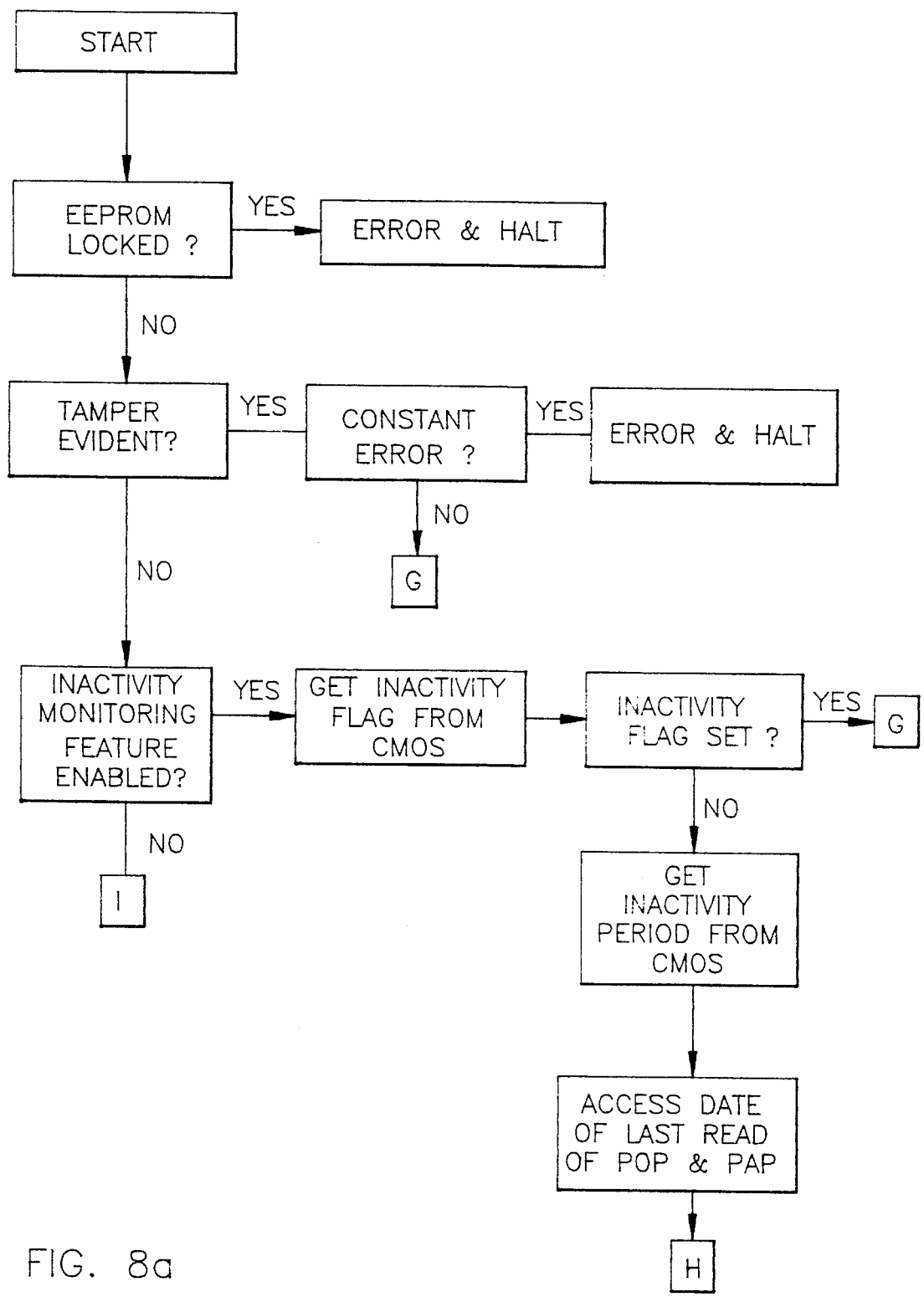
Figure 8B:
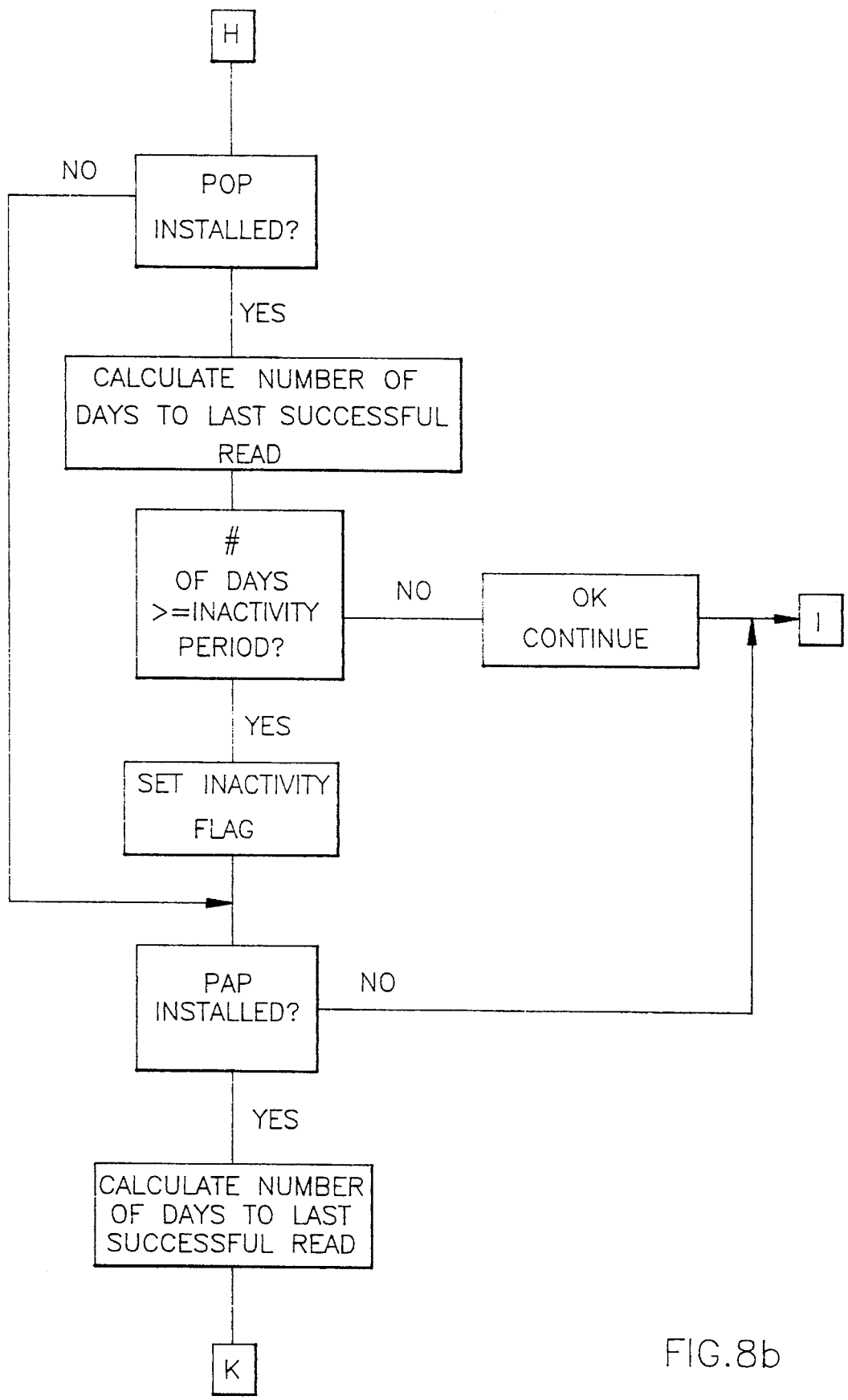
Figure 8C:
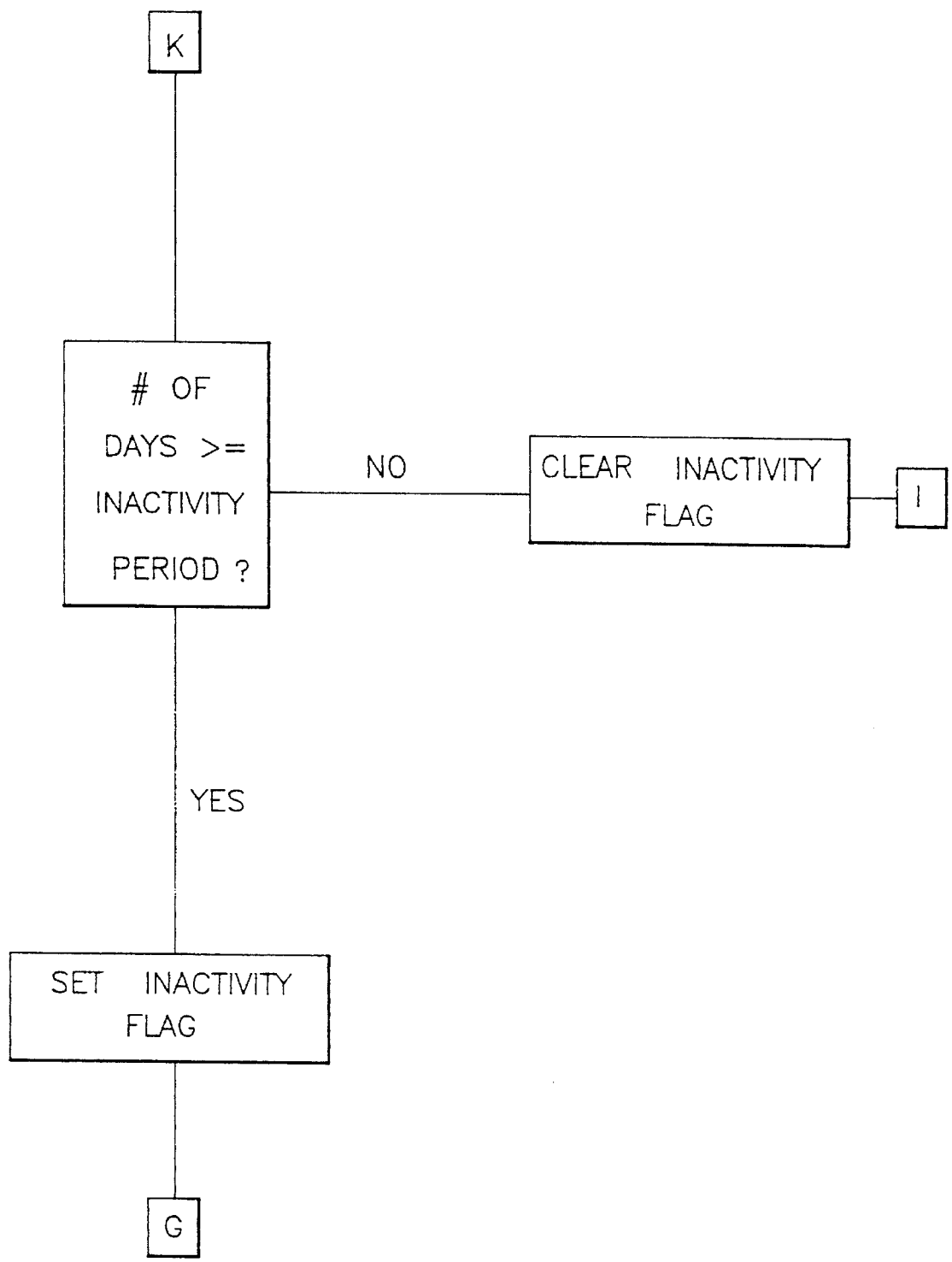
Figure 8D:
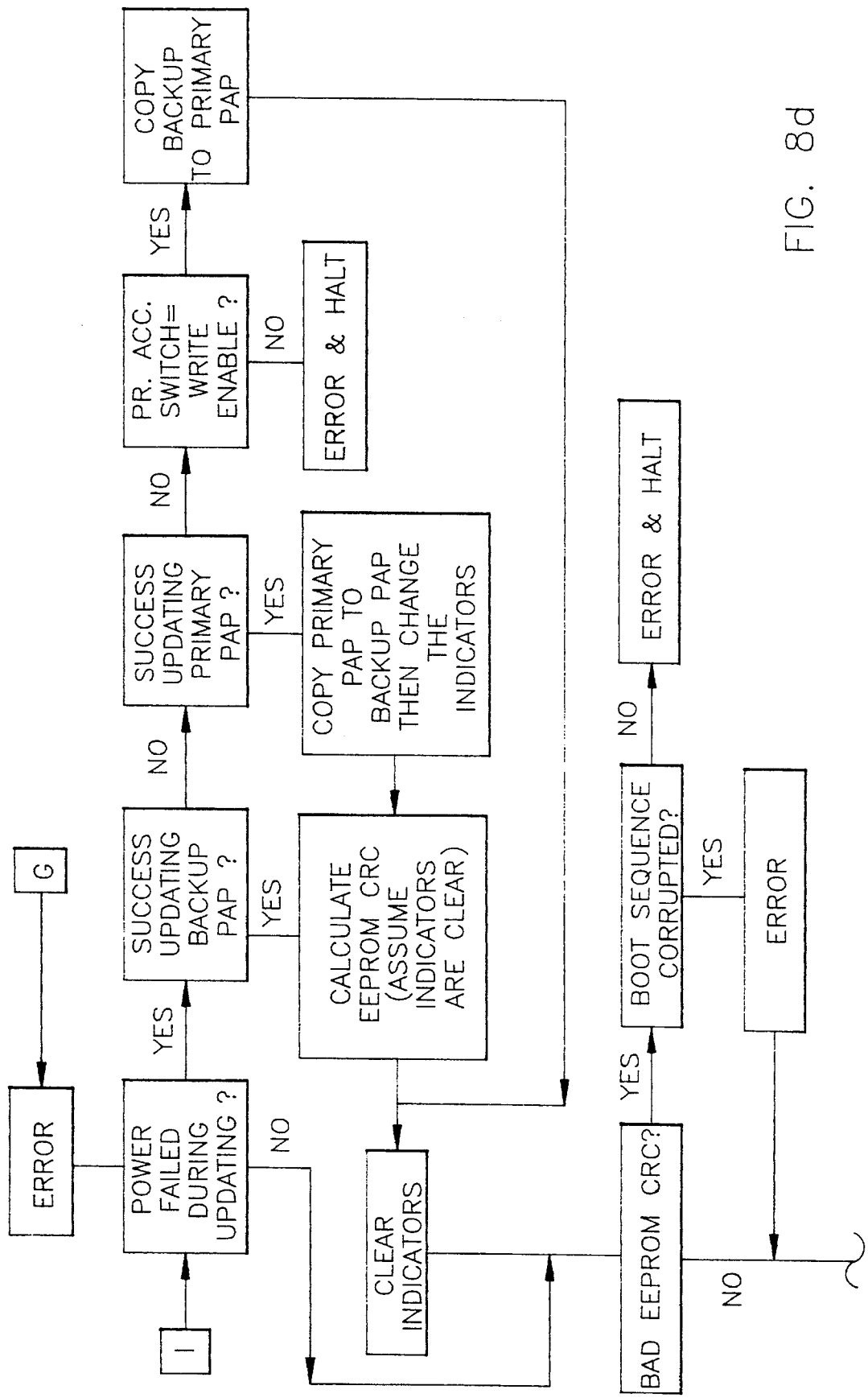
Figure 8E:
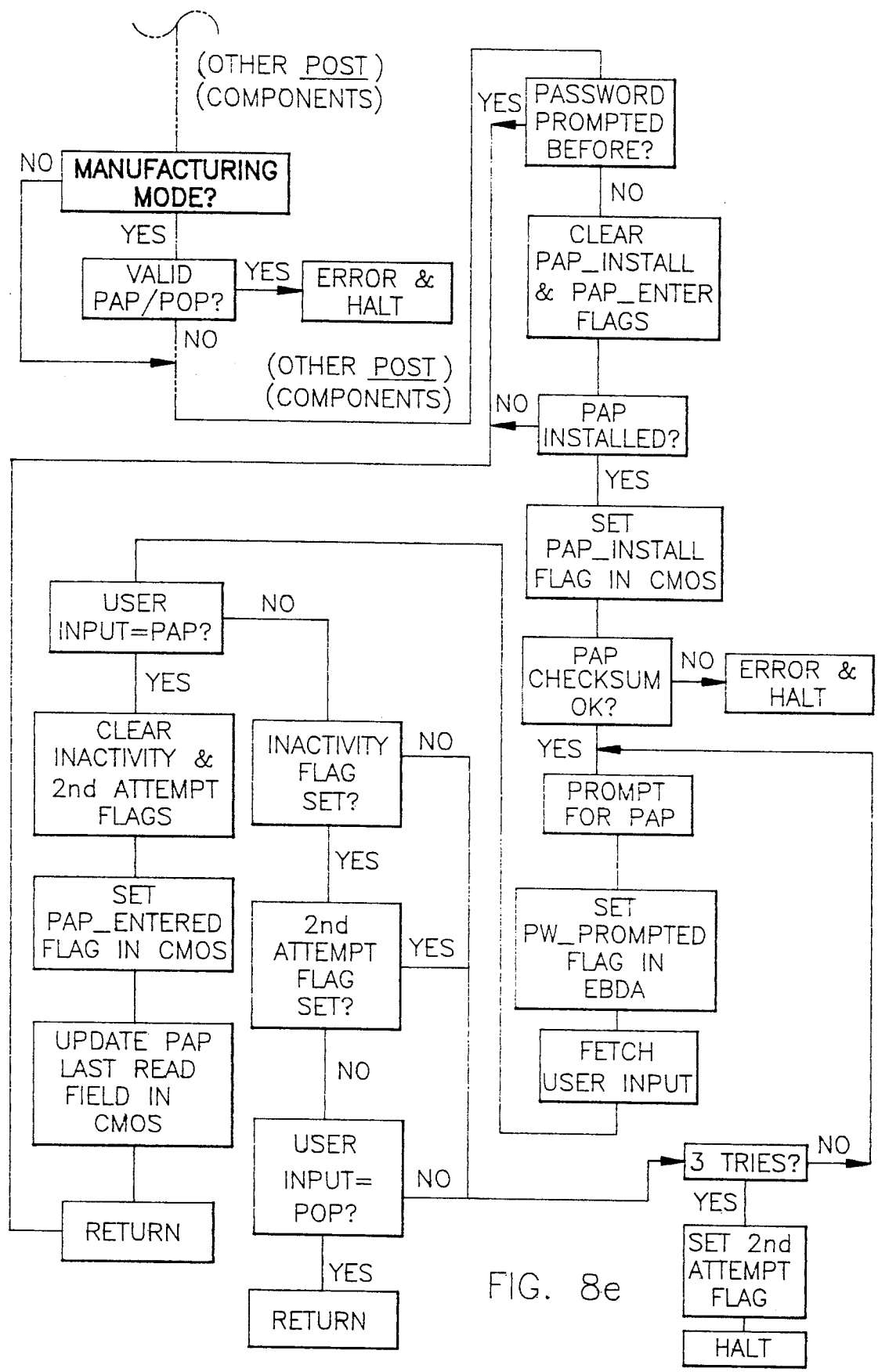
Figure 9A:
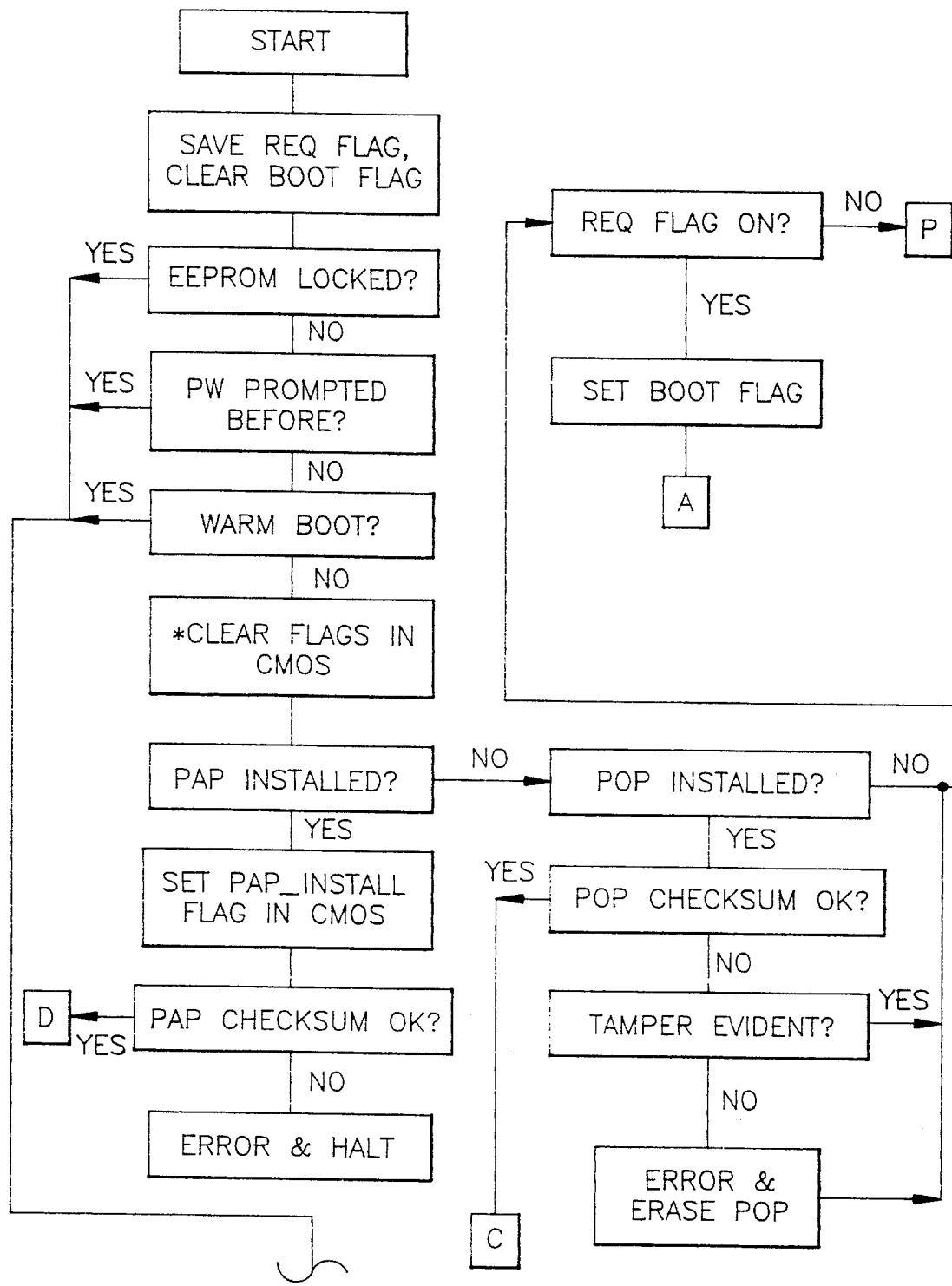
Figure 9B:
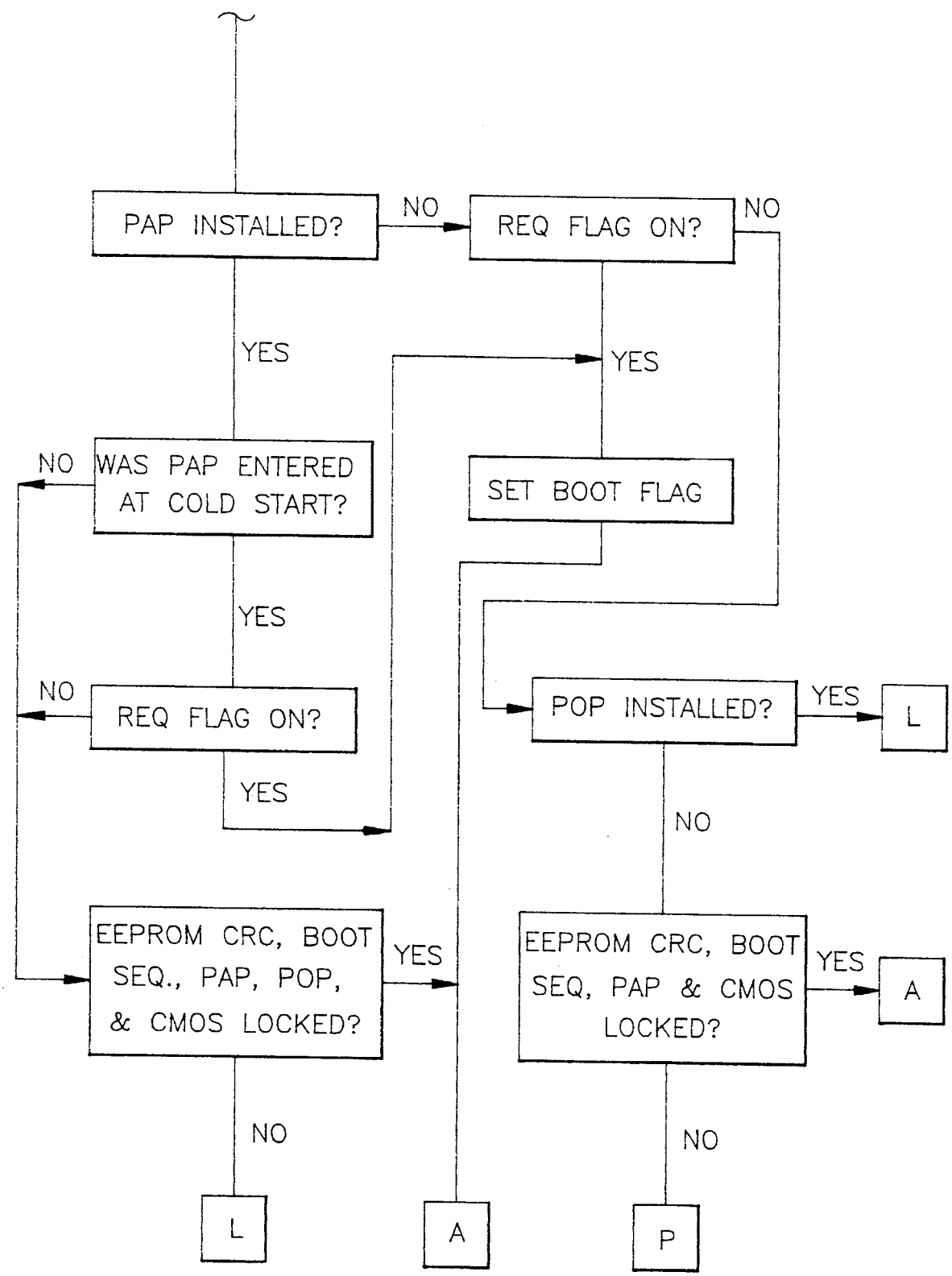
Figure 9C:
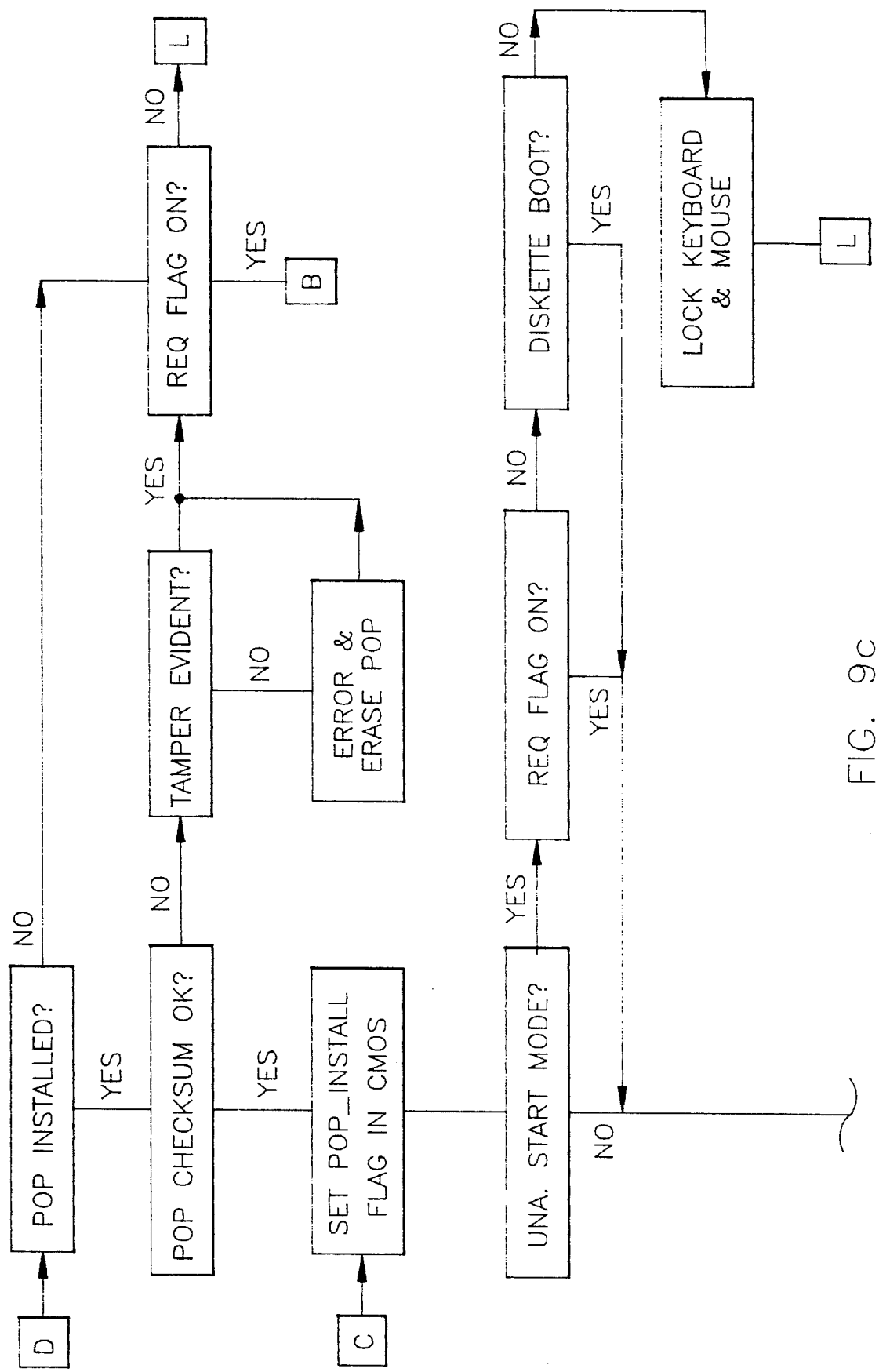
Figure 9D:
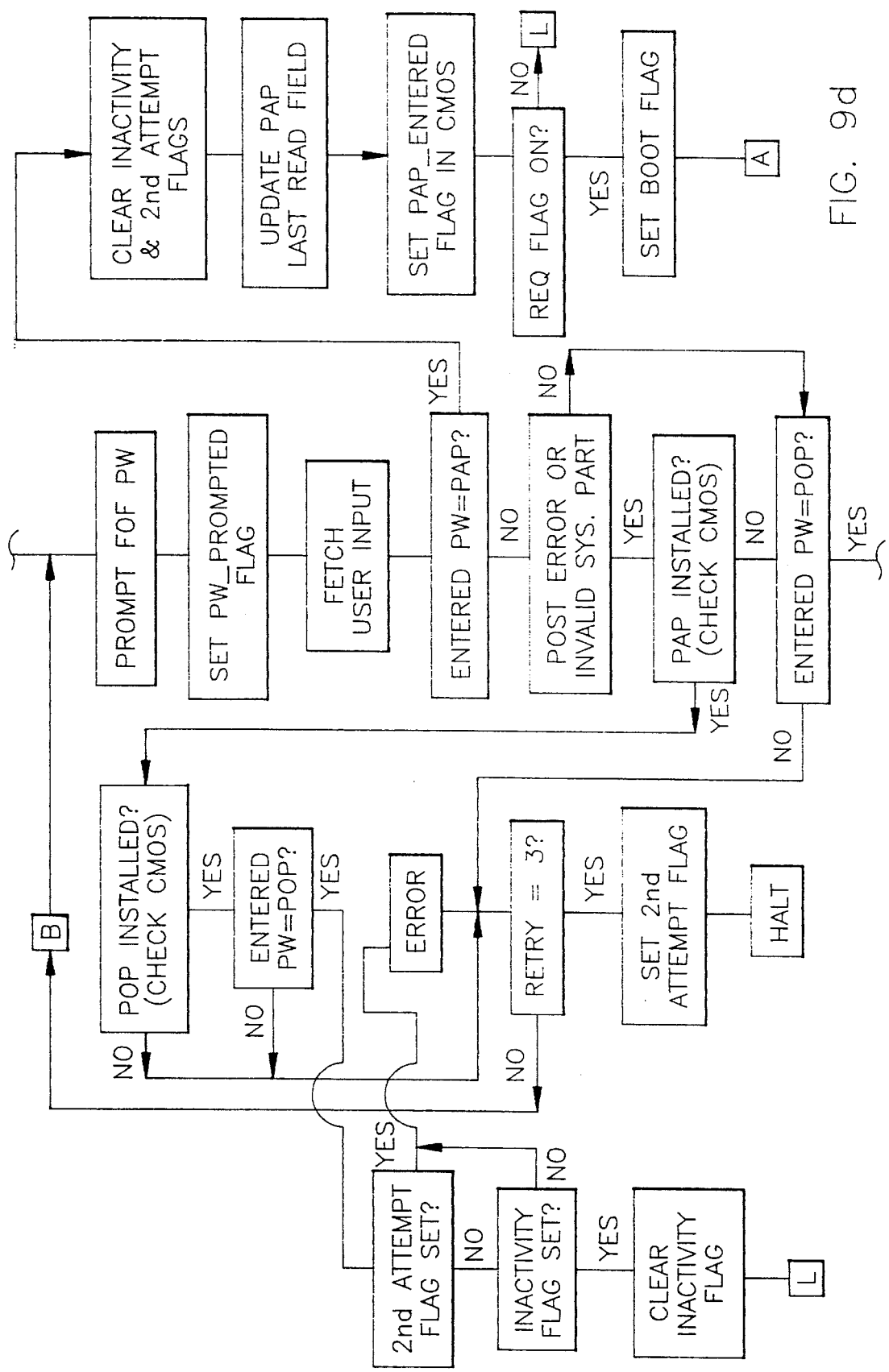

FIG. 4 illustrates certain relationships among the conventional power control or "on/off" switch 61, the conventional power supply 62, switches which change conductive state in response to opening or removal of enclosure covers such as the main cover 15 and the cable connection cover 16, and a keylock switch 64. The switches which change state on opening or removal of enclosure covers are, in the illustrated form of this invention, two in number namely a switch 65 (FIGS. 4, 5 and 6) responsive to removal of the main cover 15 and a switch 66 (FIGS. 4, 5 and 7) responsive to removal of the cable connection cover 16. Each switch has two components, one normally open (65a and 66a, respectively) and one normally closed (65b and 66b, respectively). The second switch 66 is optional, as is the cable connection cover 16. However, as will be clear from a thoughtful consideration of the disclosure here made, the presence of the optional cover and switch assures more complete security control over the system.

The normally open contact sets of the cover switches 65 and 66 are connected in series with the main power switch 61 and to the power supply 62 (FIG. 4). As a consequence, if an attempt is made to "power up" the system 10 with the covers removed, the contact sets 65a and 66a will be open and prevent system operation. With the covers in place, the contact sets are held closed and normal system operation may be initiated.

The normally closed contact sets of the cover switches 65 and 66 are connected in series with the keylock switch 64 and to the RTC and CMOS memory 68. The normally closed contact sets 65b and 66b are held open by the presence of the covers 15, 16 and will close on the removal of those covers. The keylock switch 64 is normally held closed on locking of the enclosure lock which is conventionally supplied on the computer system 10. These three contact sees provide an alternate path to ground for current otherwise energizing portions of the RTC and CMOS memory, and have the effect of setting a segment of that memory to a distinctive state (such as all "1"s) if energization is lost, as upon unauthorized removal of a cover while the system is in an enclosure locked state. As that segment in memory is checked by POST, setting that segment to a distinctive state will result in a configuration error signal being generated which will alert a system owner that an attempt (successful or otherwise) has been made to breach system security.

The keylock switch 64 and main enclosure cover switch 65 are preferably mounted on a front card guide member 69 (FIGS. 2 and 6) so as to be appropriately positioned relative to the lock provided in the main enclosure cover 15. The front card guide member is mounted in the computer system frame is such a position that an actuating lever 70 for the cover switch 65 protrudes through an opening in an upright front frame member, to be actuated by the cover 15 when present and positioned to close the system enclosure.

The cable cover switch 66 is preferably mounted on the rear panel of the system frame, positioned to be actuated by a latch member mounted on the cable cover 16 and rotatable under the control of a manually operable keylock similar to that provided on the enclosure cover 15. When the optional cable cover 16 is used (as will be the case where full security of the system is desired or required), latching or locking of the cover to the rear panel causes the latch member to close the associated normally open contact set 66a and open the normally closed contact set 66b.

The security and integrity features described above and hereinafter work independently of a previously offered personal computer security feature, the Power on Password (POP). These additional security and integrity features provide a secure platform for operating system certification under applicable regulations such as the Orange Book. An additional password is required to place the system in secure mode. The password is here referred to as the Privileged Access Password (PAP). To maintain compatibility with previous personal computer systems, the POP is still supported. This description so far deals with the security and integrity features as they relate to POST and the password utility executing on a personal computer system with an EEPROM, option switch, and tamper evident covers.

Password Security is implemented by system hardware features; an EEPROM, a security switch and a tamper evident cover switch, firmware, POST and the system software password utility. Once the PAP has been installed, the system is in secure mode. The PAP is saved in the EEPROM. A backup copy of the PAP is also maintained in the EEPROM. This is done to prevent accidental loss of the PAP when a power failure occurs during the installation, change, or removal of the PAP. The POP and at least certain bits indicative of the validity of the PAP (if installed) are stored in the CMOS RTC. Changes in data retained in the CMOS RTC and in the EEPROM are independent one from the other.

Two bits in the EEPROM are used as a state machine that lets POST know exactly where a power outage occurred in the update sequence and, if possible, recover from a system board replacement situation. The password utility maintains the update indicator field, a two bit state machine used during any access to the PAP. If a power outage occurred during the password modification, when power is restored POST checks the state machine (POST actually checks the state machine on all power ups.) If the PAP is updated successfully (a '00' state), POST proceeds in the normal manner. If the update has started before power is lost (a '01' state), POST will check for the presence of a valid backup PAP. If valid, POST copies the backup PAP into the storage for the primary PAP. If the primary PAP has been updated successfully (a '10' state), POST will use the primary PAP (the new PAP) to validate any attempts to use the system reference diskette or boot the system partition. POST will assume the backup PAP is invalid. POST will copy the primary PAP to the backup PAP in this case. If the option or security switch is not in the unlocked or write enable position an error will be displayed. The system owner will have to intervene by unlocking the covers and changing the position of the security switch.

If the backup PAP has been updated successfully (a '11' state), both the primary and backup PAP are considered valid and POST will verify the validity of the Primary PAP, prior to confirming the entry of the PAP by the user.

As mentioned above, the POP is maintained in CMOS memory. Two bits will be maintained in CMOS memory for use as password indicators for the PAP. One indicator is used to signify that the system is in secure mode (PAP installed). The second indicator is to signify that the PAP was entered during the initial power on, cold boot. These two indicators will be initialized and set at a cold boot only. Prior to IPL, the indicators will be write protected unless the system reference diskette or system partition is booted, which requires the successful entry of any installed PAP. Changes in the POP and in the indicators are independent of any changes in the PAP stored in the EEPROM. However, changes in the CMOS memory can indicate security violations which require entry of a valid PAP for recovery permitting the loading of an operating system.

To prevent any unauthorized access to the passwords, the IPL device boot list, the EEPROM CRC, and all the indicators will be locked prior to Initial Program Load (IPL) booting an operating system. To lock out these areas, POST will set special hardware latches that cannot be reset unless the system is powered off. At the beginning of POST Stage I (initial power on), POST will check to see if the EEPROM is locked. If it is locked, POST will display an error and halt the system because the hardware is not functional. The system owner will need to intervene to remedy the situation, which might require that the system board be replaced. In one form, when the system has been tampered with, the first 14 bytes of RAM storage in CMOS associated with the RTC and control registers are unaffected. The segment of CMOS is set to all "one's" (binary value 1) as briefly described above. Upon detecting this condition, POST displays an appropriate error. In another form, as little as a single bit may be set to a state indicative of tampering. In either instance, the system owner/authorized user will need to intervene to remedy the situation which might require entry of the PAP at the password prompt to boot from the system reference diskette or the system partition or that the system board be re-configured.

If the system owner forgets the PAP, the system board(s) affected will need to be replaced.

If the POP is forgotten, the system owner can open the covers and toggle another switch on the system board to destroy the contents of the POP in CMOS, and then enter the PAP (if installed) to boot the System Reference Diskette or the System Partition to run the password utility, to reinstall the POP.

When a system has been powered on with neither password installed, POST will not prompt for a password. However, if the System Reference Diskette is not present or the System Partition boot is not requested or present, POST will lock the PAP, the backup PAP, the IPL device boot list, the EEPROM CRC, and all the indicators. This is done to prevent any accidental or malicious access to these areas. If the System Reference Diskette is present or the System Partition boot is requested, these locations are left unlocked to allow the system owner to invoke secure mode. When a system has been powered on with a POP installed, but no PAP installed, POST will check the state machine and then verify the POP password checksum. If the checksum is bad, POST will erase the POP in CMOS and not prompt for a password. Otherwise, POST will prompt for a password. If the System Reference Diskette is not present or the System Partition boot is not requested, the PAP, the backup PAP, the IPL device boot list, the EEPROM CRC, and all the indicators will be locked to prevent any access.

When a system has been powered on with a valid PAP installed (Secure mode) but no POP installed, POST will verify the PAP checksum. If the checksum is good, POST will prompt the user to enter the PAP if the System Reference Diskette is present or the System Partition boot is requested. Otherwise, POST will not prompt for a password and the POP, the PAP, the backup PAP, the IPL device boot list, the EEPROM CRC, and all the indicators will be locked to prevent any access. If the PAP checksum is bad, an error is displayed and the system is halted. This is to prevent a condition where POST could accidentally give unprotected access to a user to a system which was previously in secure mode when the EEPROM failed. The system owner will need to intervene to remedy the situation which might require that the system board be replaced.

When the system has been powered on with both a valid PAP and a valid POP installed, POST will prompt the user to enter a password. If the POP is entered, POST will not boot from the System Reference Diskette or the System Partition. The system can only boot using the existing IPL device list. If the PAP is entered at the prompt rather than the POP, the user can boot from the System Reference Diskette, the System Partition, the IBL diskette, or the normal IPL device list. An indicator is set that signifies that the PAP was successfully entered at initial power up time, so that a system reference diskette or system partition boot may occur later on in this power on session. POST will not prompt the user for a password after a soft reboot, hence the need for the PAP successfully entered indicator and its protection.

In brief, if a user can boot from the System Reference Diskette or the System Partition on a cold start, the POP, the PAP, the backup PAP, the IPL device boot list, the EEPROM CRC, and all the indicators will remain unlocked. This condition gives trusted software (i.e. the System Reference Diskette) and an authorized user access to the security parameters for the system. After POST verifies that either password is entered correctly, it will acknowledge the entry by displaying a confirmation icon. POST will skip prompting for the POP as described above when Network Server (Unattended Start) Mode is active.

Flowchart logic for the scenarios just described are included within FIGS. 8a–8e and 9a–9e, where links between certain steps are indicated by process blocks occupied by single letter designations in order to simplify the charting.

A system that has a Network Server (Unattended Start) Mode installed will complete the booting process all the way through the target operating system boot but the keyboard will be locked using the POP. However, if a system reference diskette present or the System Partition boot is requested, the password prompt will be displayed to allow the owner to enter the PAP and gain control of the system. If a system is in the secure state and the user wants to boot from the system reference diskette or the system partition after the keyboard is already locked out, the user must power the system down and initiate a cold boot, from a power-off state with the system reference diskette in the diskette drive.

In conjunction with the POST changes, the password utility must include support for the PAP. The utility will support installing, changing and removing a PAP, and will interlock these three functions with the position of the option or security switch. The security switch should remain in the locked position until an authorized user wishes to set the PAP. At that time, the user should remove the system covers and move the security switch to the unlocked (change) position; then the PAP can be set. When the security switch is placed in the unlocked position, hardware logic external to the EEPROM allows the storing of the PAP into the EEPROM. When the security switch is placed in the locked position, external hardware logic prevents any changes to the PAP locations in the EEPROM. Appropriate messages will appear if the authorized user attempts to modify the PAP when the security switch is in the locked position. Also, messages will remind the user to return the security switch to the locked position after the PAP is removed. An additional safety feature is built into the password utility that prohibits the authorized user from setting the PAP equal to the POP. Checks will be made when setting or changing the PAP to ensure that the new PAP does not equal the current POP of the system. Also, when changing or removing the PAP, the current PAP must be known.

It is contemplated that a personal computer system will initially be shipped with the security switch in the locked position and the tamper evident cover locked. This is done to prevent any person other than the system owner from setting the system into secure mode. Unlike the POP, the PAP cannot be erased through hardware manipulation. If the PAP is forgotten or an unauthorized user places the system into secure mode, the system board must be replaced.

The memory elements, switches and their interconnections described herein are referred to in this description as "security feature elements," reflecting that the components named are elements of the computer system which specifically enable the security features described.

As will be understood, a personal computer system having the security capabilities described herein will be subject to attack by unauthorized users seeking to circumvent the security provisions described. One anticipatable form of attack will be a simple physical attack through openings defined in the enclosure provided by the cover 15 and chassis 19. Such openings are provided, for example, for the flow of cooling air through the enclosure; for the insertion and removal of floppy discs and other digital signal storage media; for the attachment of cables and the like; and even for the attachment (during manufacture or thereafter) of fixtures and accessories to be bolted or screwed in place. Any such opening may present an opportunity for the insertion of a probe by an unauthorized user seeking to avoid the security features described. Thus, a knowledgeable attacker might seek to erase the PAP or POP from the memory elements in which that data is stored, or seek to supply power in a way which would defeat the interlock switch arrangements described.

The resolution of protection against such attacks is to mount the memory elements and switches disposed within the computer system enclosure at locations inaccessible to any unauthorized user of the personal computer system attempting to affect the operation of any one of the memory elements and switches by insertion of a probe through an opening. The opening probed may be a ventilation opening for the passage of cooling air or, with ingenuity on the part of the attacker, any other one of the various openings described above. The probe may be a simple mechanical device such as a bent paper clip, or some more sophisticated device configured specifically to reach a security feature element such as those described or to emit some form of energy (electrical, sonic, radiation) which would so disrupt the normal operation of the security feature element as to permit an unauthorized user to gain access to otherwise protected data.

Security feature elements as described above can be protected against probing attack of the types described by being positioned either at such distances from enclosure openings as to defeat mechanical probing attack or at positions shielded by other computer elements which are of a non-sensitive nature. Signal pathways connecting security feature elements and possibly carrying digital signals related to security functions may be protected against attack by being placed in the interior of multiple layer printed circuit boards. Openings defined in the computer enclosure may be configured to restrict or prevent attacking access, as by being configured as tortuous passageways or being occluded by non-sensitive elements.

The present invention contemplates prior art computer systems of the type described above which further include the optional capability of rendering a system non-operational in the event that the inactivity monitor of the present invention has been enabled and determines that the system has been inactive for a period of time exceeding a value specified by the system owner. The system is rendered inoperable by POST during power-up of the system after a determination that the period of inactivity exceeds the specified period.

Incorporation of an inactivity monitor that operates in conjunction with the other PC or PS/2 system security features (as described in the prior art) will provide additional security against the loss of data by rendering the system non-operational. The new feature will assist the system owner in enforcing the established security policy and allows the system owner to track usage of a system by identifying those systems not in use. Once identified, an inactive system can be dealt with as defined in the security policy, thus enhancing the marketability of systems implementing this feature.

It is contemplated that newer personal computer systems will include the optional capability to detect when a specified period of time has been exceeded between successive usages of a system. If enabled and the system is in the inactive state (the inactivity period exceeds the specified period), the computer system is rendered non-operational by POST. In order to reactivate the system, the system owner must enter the Privileged Access Password (PAP).

After a power-up from a powered-down state, POST will check to see if the inactivity period has been exceeded. If exceeded, POST will prompt for a password to be entered. If the appropriate password is not correctly entered during this power-on session, POST will set an indicator to prompt for the PAP and render the system non-operational. After this time, the system can only be reactivated by entering the PAP. If the user doesn't have knowledge of the PAP, the system owner or authorized user must be contacted to reactivate the system. The system owner or an authorized user has knowledge of the PAP, the user typically has knowledge of only the Power-On Password (POP).

Enabling the inactivity monitor requires that the owner first place the system in a secure mode by rendering the EEPROM 59 active by setting the option switch to the appropriate position and by installing the PAP (and POP) as described above. An EEPROM active bit or flag is set in CMOS 68. The activity monitor can be enabled at PAP installation time or at a later time by the system owner. The system owner can also change the specified period of inactivity. Enabling, disabling, and changing of the specified inactivity period requires knowledge of the PAP.

In a preferred embodiment of the invention, the system must also implement tamper evident covers, audit trails for use of access control and the prevention of tampering via access openings as described above and in the prior art. Otherwise, the audit trail of usage events would be compromised.

As set forth above, a system is in the Inactive state if the time between successive uses of all installed passwords exceeds the time period specified by the system owner when enabling the inactivity monitor. A system is in the Active state when the time between successive uses of any installed password does not exceed the time period specified by the system owner when enabling the inactivity monitor. In a preferred embodiment, it is anticipated that the specified period will be in the order of a few days longer.

The real time clock (RTC) and associated CMOS storage 68 is required for determining time periods between successive uses of the passwords. The write protected areas of non-volatile storage are required for maintaining various status bits or flags associated with the inactivity monitor of the present invention.

In order to enable the inactivity monitoring feature, the system owner will invoke a system supplied utility. The utility is run from the system reference diskette image command menu. When the inactivity utility is invoked, the owner will be asked whether to disable or enable the inactivity monitoring feature. When enabling the feature, an inactivity monitor bit is set in CMOS and the owner will also supply the number of days of password non-usage that defines the period after which the system is considered to be in the inactive state. This value is stored in CMOS 68. If the inactivity monitor feature is enabled, the owner should instruct all users to power-off the system when not in use. If power is left on while the feature is enabled, the operating system must implement its own inactivity monitor and deny access to a user after a predetermined period of time. In order to reactivate a session with the operating system, the user must repeat the normal login procedure.

If the feature is disabled, the system will not monitor time periods between uses of the system passwords.

The present invention may be used in either of two modes. The preferred mode requires that both the PAP and POP be installed so that, in some instances, a normal user can reactivate the system by the successful entry of POP during a power-up sequence. The owner of the system or an authorized user of the system need not be found to reactivate the system.

The other mode contemplates installation of PAP only.

The operation in each of the modes will be described briefly. The preferred embodiment is described first.

At the next power-up from a powered-off state, POST will check to see if the inactivity monitor facility is enabled and if the inactivity period has been exceeded. POST will access the date and time used fields for the POP and the PAP. These fields (along with others are defined in the prior art) are stored in non-volatile memory 68. Management of these fields is described in the prior art and no changes are required for the inactivity monitoring feature. If the number of days since the most recent successful access of a password is greater than the number of days specified in the inactivity period (the inactivity period has been exceeded), POST will prompt for a password prior to booting either the system reference diskette image on a diskette or on the system partition or the operating system. POST will accept either the PAP or the POP to proceed to the specified boot device.

If the POP is entered, the system reference diskette image on either a diskette or on the system partition will not be booted. POP can only boot the operating system. A PAP must be entered if this is a known system reference image boot. If a password is correctly entered, POST will display a message indicating that the system's inactivity period has been exceeded and update the appropriate password's date and time used fields in non-volatile memory. If three attempts at correctly entering the password fail, POST will render the system non-operational. From this point on, POST will only accept a correctly entered PAP, an indicator is set in non-volatile memory that tells subsequent POST executions that the PAP must be correctly entered prior to booting. In order to reactivate the system, it is necessary to power-off the system and then power it on to obtain the prompt for the PAP. Until the PAP is correctly entered, the system will not boot and thus renders the system non-operational. POST will render the system non-operational every three unsuccessful attempts at correctly entering the PAP during a single power-on session. A power-off and power-on cycle is required prior to being allowed to enter the PAP once again. If this condition exists, it may require that the user return the system to either the system owner or an authorized user to be reactivated, unless the user has knowledge of the PAP.

Operation with both the POP and PAP installed is the envisioned mode of operation for mobile systems. If the inactivity monitoring feature is enabled and the period is exceeded, a system with only a PAP installed will give the user no chance to reactivate the system without tracking down a system owner or authorized user to obtain the PAP. This might be difficult to do considering that the two people, the user and the PAP knowledgeable person, may be in different physical locations and at different time zones. It is also recommended that this event be reported by the user to the system owner or an authorized user to insure the integrity of the audit trail and help maintain the security policy established by the system owner.

The mode with PAP only installed will now be described.

At the next power-up from a powered-off state, POST will check to see if the inactivity monitor feature is enabled and if the inactivity period has been exceeded. POST will access the date and time used fields for the PAP, these fields are the same ones described in the PAP and POP installed description above. If the number of days since the PAP was last successfully accessed is greater than the number of days specified in the inactivity period (the inactivity period has been exceeded), POST will prompt for the PAP prior to booting either the system reference diskette image on diskette or in the system partition or the operating system. POST will only accept correct entry of the PAP. If the PAP is correctly entered, POST will display a message indicating that the system inactivity period has been exceeded and update the PAP's date and time used fields. If three attempts at correctly entering the PAP fail, POST will render the system non-operational. In order to reactivate the system, it is necessary to power-off the system and then power it on to obtain the prompt for the PAP. Until the PAP is correctly entered, the system will not boot and thus render the system non-operational. POST will render the system non-operational every three unsuccessful attempts at correctly entering the PAP during a single power-on session. A power-off and power-on cycle is required prior to being allowed to enter the PAP once again. If this condition exists, it may require that the user return the system to either the system owner or an authorized user to be reactivated, unless the user has knowledge of the PAP.

As illustrated in greaser detail in the following flowcharts of FIGS. 8a–8e and 9a–9e, during a power-up from a power-off state, POST checks the status of the EEPROM and the tamper evident mechanism of the related prior art application Ser. No. 840,965. Then POST determines whether or not the inactivity monitoring feature is enabled by checking a designated bit in CMOS storage 68.

POST then accesses an inactivity flag in CMOS storage 68 to determine whether or not the computer system has, during a previous power-up, been found to be in an inactive or active system state. The inactivity flag is set to a logical "1" state if the system is inactive.

If the inactive flag is set, POST will eventually prompt for PAP and/or POP in an attempt to reactivate the system.

If the inactive flag is not set, POST will access the specified inactive period value and the dates of the last successful reads of the POP and PAP passwords. POST then determines whether or not POP is installed; and, if it is, it calculates the number of days since the last successful read of either POP or PAP, whichever is smallest, and compares it with the specified inactivity period. If the inactivity period is not exceeded, POST continues. If the period is exceeded, POST sets the inactivity flag and then continues.

If POST determined in the steps immediately above the POP was not installed, it then determines whether or not PAP is installed. If it is not installed, POST continues. If PAP is installed, POST calculates the value of the time to the last successful read of PAP, compares it with the specified inactivity period, clears the inactivity flag if the inactivity period is not exceeded, and sets the inactivity flag if the period is exceeded. POST then continues the power-on procedure.

In the event that POST determines that the specified inactivity period has been exceeded and the system is therefore in an inactive state, POST will prompt the user to enter a password—POP in the preferred embodiment. If the correct value of POP is not entered, POST will prompt a second time for entry of POP. If the correct value of POP is not entered a second time, POST will again prompt for the entry of POP by the user. If this fails for a third time, POST sets a flag and halts the system. This flag permits only a successful entry of PAP to reactivate the system.

On the next power-up, POST prompts only for PAP. If PAP is successfully entered, the system is reactivated. After three attempts to enter PAP without success, POST renders the system non-operational.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A personal computer system for receiving and retaining data and capable of securing data retained within the system against unauthorized access, the system comprising:

a normally closed enclosure;

an erasable memory element mounted within said enclosure for selective activation to active and inactive states and for receiving and storing a privileged access password when in the active state;

a manually operable option switch mounted within said enclosure, said option switch being operatively connected with said erasable memory element and manually settable by a user of the personal computer system for setting said erasable memory element to the active and inactive states;

an inactivity monitor in the computer system for determining whether or not a measured time period between successive uses of the system exceeds a specified inactivity period;

means for selectively enabling and disabling the inactivity monitor;

means for inhibiting a successful power-up of the computer system in response to a determination by the inactivity monitor, while enabled, that the measured time period exceeds the specified inactivity period; and a system processor mounted within said enclosure and operatively connected with said erasable memory element for controlling access to at least certain levels of data stored within the system by distinguishing between entry and non-entry of the password and between the enabled and disabled state of the inactivity monitor.

2. The personal computer system of claim 1 wherein the system processor, during power-up subsequent to the determination that the measured time exceeds the specified inactivity period, reactivates the system upon the successful entry of the privileged access password by a user of the system.

3. The personal computer system of claim 1, wherein the erasable memory element receives and stores a power-on password and wherein said system processor, during power-up subsequent to the determination that the measured time period exceeds the specified inactivity period, activates the system upon the successful entry of the power-on password by a user of the system to permit access to certain levels of data stored within the system.

4. The personal computer system of claim 3, wherein said system processor, subsequent to an unsuccessful attempt to enter the power-on password, activates the system upon the successful entry of the privileged access password by an authorized user of the system to permit access to all levels of data stored within the system.

5. The personal computer system of claim 4, wherein the system processor continues normal program execution incident to the successful entry of either password.

6. The personal computer system of claim 1, wherein the system processor provides an indication to the system user of the measured time period exceeding the specified inactivity period for maintaining an audit trail for the system owner.

7. A personal computer system for receiving and retaining data and capable of securing data retained within the system against unauthorized access, the system comprising:

a normally closed enclosure;

an erasable memory element mounted within said enclosure for selective activation to active and inactive states and for receiving and storing a power-on password and a privileged access password;

a manually operable option switch mounted within said enclosure, said option switch being operatively connected with said erasable memory element and manually settable by a user of the personal computer system for setting said erasable memory element to the active and inactive states;

a tamper detection switch mounted within said enclosure and operatively connected with said erasable memory element for detecting opening of said enclosure;

A real time clock;

an inactivity monitor in the computer system for determining whether or not a time period between successive uses of the system measured by the clock exceeds a specified inactivity period;

program controlled means for selectively enabling and disabling the inactivity monitor;

means for preventing a successful power-up of the computer system in response to switching of the tamper detection switch and in response to a determination by the inactivity monitor, while enabled, that the measured time period exceeds the specified inactivity period; and a system processor mounted within said enclosure and operatively connected with said erasable memory element for controlling access to at least certain levels of data stored within the system by distinguishing between the active and inactive states of said memory element, between entry and nonentry of the passwords, and between the enabled and disabled state of the inactivity monitor.

8. The personal computer system of claim 7, wherein said system processor, during power-up subsequent to the determination that the measured time period exceeds the specified inactivity period, reactivates the system upon the successful entry of the power-on password by a user of the system to permit access to certain levels of data stored within the system.

9. The personal computer system of claim 8, wherein said system processor, subsequent to at least one unsuccessful attempt to enter the power-on password, reactivates the system upon the successful entry of the privileged access password by an authorized user of the system to permit access to all levels of data stored within the system.

10. The personal computer system of claim 9, wherein the system processor continues normal program execution incident to the successful entry of one of the passwords by a user of the system.

11. The personal computer system of claim 7, wherein the system processor provides an indication to the system user of the measured time period exceeding the specified inactivity period for maintaining an audit trail for the system owner.

12. A personal computer system for receiving and retaining data and capable of securing data retained within the system against unauthorized access, the system comprising:

a normally closed enclosure;

an inactivity monitor in the system for measuring the time between successive uses of the system and for determining whether or not the measured time exceeds a specified inactivity period;

program controlled means for selectively rendering the inactivity monitor enabled and disabled;

a first erasable memory element mounted within said enclosure for selective activation to active and inactive states and for receiving and storing a privileged access password when in the active state;

an option switch mounted within said enclosure and operatively connected with said first erasable memory element for setting said first erasable memory element to the active and inactive states;

a second erasable memory element mounted within said enclosure for receiving and storing a power-on password and data indicative of the enabled state of the inactivity monitor, the state of said first erasable memory element, and of correct installation of any stored power-on password and privileged access password;

a tamper detection switch mounted within said enclosure and operatively connected with said second erasable memory element for detecting unauthorized opening of said enclosure;

means for preventing a successful power-up of the computer system in response to switching of the tamper detection switch and in response to the inactivity monitor while it is enabled, determining that the measured time exceeds the specified inactivity period; and a system processor mounted within said enclosure and operatively connected with said erasable memory elements for controlling access to at least certain levels of data stored within the system by distinguishing between the enabled and disabled state of the inactivity monitor, between the active and inactive states of said first memory element, and between entry and non-entry of any valid stored privileged access password and any valid stored power-on password in the first and second erasable memory elements.

13. The personal computer system of claim 12, wherein said system processor, during power-up subsequent to the determination that the measured time exceeds the specified inactivity period reactivates the system upon the successful entry of the power-on password by a user of the system to permit access to certain levels of data stored within the system.

14. The personal computer system of claim 13, wherein said system processor, subsequent to an unsuccessful attempt to enter the power-on password, reactivates the system upon the successful entry of the privileged access password by an authorized user of the system to permit access to all levels of data stored within the system.

15. The personal computer system of claim 14, wherein the system processor continues normal program execution incident to the successful entry of one of the passwords by a user of the system.

16. The personal computer system of claim 12, wherein the system processor provides an indication to the system user of the measured time exceeding the specified inactivity period for maintaining an audit trail for the system owner.

17. A method of operating a personal computer system having an enclosure, a system processor mounted within the enclosure, a selectively activatable erasable memory element mounted within the enclosure, a manually operable option switch mounted within the enclosure manually settable by a user of the personal computer system for setting the memory element to active and inactive states, a tamper detection switch mounted within the enclosure for detecting opening of the enclosure, an inactivity monitor for determining whether or not a measured time between successive uses of the system exceeds a specified inactivity period, and a utility program invocable by the user for rendering the inactivity monitor enabled and specifying the inactivity period, the method comprising the steps of:

manually setting the option switch and selectively setting the memory element into the active state;

storing a privileged access password in the active memory element;

invoking the utility program to enable the inactivity monitor;

controlling access to at least certain levels of data stored within the system by distinguishing between entry and non-entry of the password and between an enabled and disabled state of the inactivity monitor; and inhibiting a power-up of the system in response to any switching of the tamper switch and in response to a determination by the enabled inactivity monitor that the measured time exceeds the specified inactivity period while the privileged access password is stored in the memory element.

18. The method of claim 17, further comprising the steps of:

storing a power-on password in the memory element; and during power-up, subsequent to a determination that the measured time exceeds the specified inactivity period, reactivating the system in response to the successful entry of the power-on password by a user of the system to permit access to certain levels of data stored within the system.

19. The method of claim 18, further comprising the step of:

subsequent to an unsuccessful attempt to enter the power-on password, reactivating the system in response to the successful entry of the privileged access password by a user of the system to permit access to all levels of data stored within the system.

* * * * *